US012400193B2

(12) United States Patent
Shao et al.

(10) Patent No.: US 12,400,193 B2
(45) Date of Patent: Aug. 26, 2025

(54) INSPECTION METHOD AND INTERNET OF THINGS (IOT) SYSTEM FOR SMART GAS SUPERVISION INFORMATION

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/830,833

(22) Filed: Sep. 11, 2024

(65) Prior Publication Data

US 2024/0428206 A1    Dec. 26, 2024

(30) Foreign Application Priority Data

Aug. 22, 2024    (CN) .......................... 202411154883.1

(51) Int. Cl.
*G06Q 30/00*    (2023.01)
*G06Q 10/20*    (2023.01)
(Continued)

(52) U.S. Cl.
CPC .............. *G06Q 10/20* (2013.01); *G06Q 50/06* (2013.01); *G16Y 10/35* (2020.01); *G16Y 40/10* (2020.01)

(58) Field of Classification Search
None
See application file for complete search history.

(56) References Cited

U.S. PATENT DOCUMENTS 11,237,030 B2 *   2/2022   Shao ...................... G01D 18/00
11,953,874 B2 *   4/2024   Shao ................ G05B 19/41875
(Continued)

FOREIGN PATENT DOCUMENTS

CN    116506470 A    7/2023
CN    116668491 A    8/2023
(Continued)

OTHER PUBLICATIONS

Hui, L. "The Key Technologies and Applications of Cable Corridor Resource Management and Monitoring based on GIS and IoT." 2021 China International Conference on Electricity Distribution (CICED), Shanghai, China, 2021, pp. 313-317. (Year: 2021).*

(Continued)

*Primary Examiner* — Luis A Brown
(74) *Attorney, Agent, or Firm* — METIS IP LLC

(57) ABSTRACT

Disclosed is an inspection method and an Internet of Things system for smart gas supervision information, comprising: obtaining an inspection route; determining a plurality of inspection sub-routes; generating a calling instruction and an acquisition instruction, and sending the calling instruction and the acquisition instruction to a government gas supervision object platform and a gas equipment object platform; determining an inspection type parameter of each of a plurality of inspection sub-routes based on pipeline supervision information and facility supervision information, and determining an inspection assignment parameter; generating an inspection instruction, and sending the inspection instruction to the gas equipment object platform; in response to determining that an actual coverage satisfies a first preset condition, updating the plurality of inspection sub-routes; adjusting the inspection assignment parameter, and sending the inspection assignment parameter to the gas equipment object platform; after the inspection is completed, sending a (Continued)

current pipeline inspection result and pipeline defective information to the government gas supervision object platform.

8 Claims, 6 Drawing Sheets

(51) Int. Cl.
  *G06Q 50/06*    (2012.01)
  *G16Y 10/35*    (2020.01)
  *G16Y 40/10*    (2020.01)

(56) References Cited

U.S. PATENT DOCUMENTS

| | | | |
|---|---|---|---|
| 2018/0260626 A1* | 9/2018 | Pestun | G08G 5/80 |
| 2020/0309632 A1* | 10/2020 | Shao | G01D 18/00 |
| 2022/0250658 A1* | 8/2022 | Blonder | G05D 1/0212 |
| 2022/0276116 A1* | 9/2022 | Sadovnychiy | G01M 3/2807 |
| 2023/0083626 A1* | 3/2023 | Shao | G06N 20/00 |
| | | | 701/2 |
| 2023/0143654 A1* | 5/2023 | Shao | G06Q 10/20 |
| | | | 705/7.26 |
| 2023/0417372 A1* | 12/2023 | Shao | G16Y 20/10 |
| 2024/0019086 A1* | 1/2024 | Pirsiavash | G01N 17/00 |
| 2024/0426613 A1* | 12/2024 | Vishwanathula | G01C 21/203 |
| 2025/0029224 A1* | 1/2025 | Singh | B64U 10/00 |

FOREIGN PATENT DOCUMENTS

| | | | | |
|---|---|---|---|---|
| CN | 117973877 A | 5/2024 | | |
| WO | WO-2021181369 A1 * | 9/2021 | | F17D 5/06 |

OTHER PUBLICATIONS

Fontenla-Carrera, Gabriel. "Route Optimization of Vessel-UAV Tandem Systems for Offshore Wind Farm Inspections." 2024 International Conference on Unmanned Aircraft Systems, Jun. 4-7, 2024, Chania, Crete, Greece. (Year: 2024).*

L. Hui, "The Key Technologies and Applications of Cable Corridor Resource Management and Monitoring Based on GIS and IoT" 2021 China International Conference on Electricity Distribution (CICED), Shanghai, China, 2021, pp. 313-317. (Year: 2021).*

Qiu, Rui, et al. "A Novel Approach for Two-Stage UAV Path Planning in Pipeline Network Inspection." Proceedings of the 2020 13th International Pipeline Conference (IPC2020), Sep. 28-30, 2020. (Year: 2020).*

Muller, Johannes. "Drone Routing Optimizer for Aerial Inspections of Energy and Railway Infrastructures." AIAA Aviation 2022 Forum, Jun. 27-Jul. 1, 2022, Chicago, IL. (Year: 2022).*

FontenIa-Carrera, Gabriel. "Route Optimization of Vessel-UAV Tandem Systems for Offshore Wind Farm Inspections." 2024 International Conference on Unmanned Aircraft Systems, Jun. 4-7, 2024, Chania, Crete, Greece. (Year: 2024).*

Latha, S. "Enhancing Facility Safety for Autonomous Gas Inspection Drones Leveraging Convolutional Neural Networks and IoT Technology." 2024 11th International Conference on Reliability, Infocom Technologies and Optimization. Amity University, India, Mar. 14-15, 2024. (Year: 2024).*

Notification to Grant Patent Right for Invention in Chinese Application No. 202411154883.1 mailed on Oct. 12, 2024, 4 pages.

First Office Action in Chinese Application No. 202411154883.1 mailed on Sep. 23, 2024, 10 pages.

* cited by examiner

400

410 — In response to determining that a predicted inspection effect satisfying a second preset condition does not exist, determining at least one target sub-route and an adjustment type of the at least one target sub-route

420 — In response to determining that the adjustment type is a first type, obtaining at least one new target sub-route by adjusting the at least one target sub-route based on the predicted inspection effect corresponding to the at least one target sub-route

430 — In response to determining that the adjustment type is a second type, updating an inspection type parameter of the at least one target sub-route based on the predicted inspection effect corresponding to the at least one target sub-route

440 — In response to determining that a count of the at least one target sub-route of which the adjustment type is the second type exceeds a count threshold, determining the at least one new target sub-route and the predicted inspection effect of the at least one new target sub-route based on a pipeline distribution of the at least one target sub-route

FIG. 4

INSPECTION METHOD AND INTERNET OF THINGS (IOT) SYSTEM FOR SMART GAS SUPERVISION INFORMATION

CROSS-REFERENCE TO RELATED APPLICATIONS

This application claims priority to Chinese Application No. 202411154883.1, filed on Aug. 22, 2024, the entire contents of which are incorporated herein by reference.

TECHNICAL FIELD

The present disclosure relates to the field of smart gas technology, and in particular to an inspection method and an Internet of Things (IoT) system for smart gas supervision information.

BACKGROUND

In order to meet the requirements of inspection intelligence, people are now more inclined to use unmanned inspection equipment (e.g., a drone, an unmanned inspection vehicle, a robot, etc.) to replace manual inspection. However, on the one hand, the application scope of the unmanned inspection equipment is relatively limited (e.g., it is difficult for the unmanned inspection vehicle to operate when the ground in the inspection area is uneven or there are obstacles); on the other hand, the inspection cost of using the unmanned inspection equipment is relatively high, and ineffective inspection and repeated inspection (e.g., if the data obtained by the unmanned inspection equipment is unavailable, manual inspection needs to be arranged again) may occur, which increases the extra labor and time cost.

Therefore, it is desirable to provide an inspection method and an Internet of Things (IoT) system for smart gas supervision information, which can determine whether to perform drone inspection, robotic inspection, or manual inspection based on the relevant information (e.g., pipeline supervision information, facility supervision information, etc.) of an inspection route to ensure the validity of the inspection data and reduce the waste of resources during the inspection process.

SUMMARY

One or more embodiments of the present disclosure provide an inspection method for smart gas supervision information, implemented based on an Internet of Things (IoT) system for smart gas supervision information. The IoT system for the smart gas supervision information may include a public user platform, a citizen cloud service platform, a government gas supervision management platform, a government gas supervision sensor network platform, a government gas supervision object platform, a gas company sensor network platform, and a gas equipment object platform. The government gas supervision object platform may include a gas company management platform. The inspection method may be implemented by the government gas supervision management platform. The inspection method may comprise: obtaining an inspection route based on the gas company management platform; determining a plurality of inspection sub-routes by performing segmentation processing on the inspection route, and storing the plurality of inspection sub-routes to the government gas supervision object platform; generating a calling instruction and sending the calling instruction to the gas company management platform of the government gas supervision object platform for implementation, wherein the calling instruction is configured to obtain pipeline supervision information corresponding to the plurality of inspection sub-routes, the pipeline supervision information including at least one of pipeline defective information and a pipeline inspection result of a first historical time period; generating an acquisition instruction based on the gas company management platform and sending the acquisition instruction to the gas equipment object platform for implementation, wherein the acquisition instruction is configured to control gas appurtenant facilities deployed on the plurality of inspection sub-routes to acquire and upload facility supervision information; determining an inspection type parameter of each of the plurality of inspection sub-routes based on the pipeline supervision information and the facility supervision information, wherein the inspection type parameter includes at least one of drone inspection, robotic inspection, and manual inspection; determining an inspection assignment parameter based on the inspection type parameter; generating an inspection instruction and sending the inspection instruction to the gas equipment object platform for implementation, wherein the inspection instruction is configured to control inspection equipment and/or an inspector to perform the inspection assignment parameter; during the inspection, in response to determining that an actual coverage of one or more of the inspection sub-routes satisfies a first preset condition, updating the plurality of inspection sub-routes to obtain new inspection sub-routes, the new inspection sub-routes including uncovered sub-routes; adjusting the inspection assignment parameter based on the uncovered sub-routes; sending an updated inspection assignment parameter to the gas equipment object platform for implementation; and after the inspection is completed, sending a current pipeline inspection result and the pipeline defective information corresponding to the new inspection sub-routes to the gas company management platform of the government gas supervision object platform for storage.

One or more embodiments of the present disclosure provide an Internet of Things (IoT) for smart gas supervision information, comprising a public user platform, a citizen cloud service platform, a government gas supervision management platform, a government gas supervision sensor network platform, a government gas supervision object platform, a gas company sensor network platform, and a gas equipment object platform. The public user platform and the citizen cloud service platform may perform bidirectional interaction. The government gas supervision management platform may perform upward bidirectional interaction with the citizen cloud service platform and perform downward bidirectional interaction with the government gas supervision sensor network platform. The government gas supervision management platform may be configured to: obtain an inspection route based on the gas company management platform; determine a plurality of inspection sub-routes by performing segmentation processing on the inspection route, and store the plurality of inspection sub-routes to the government gas supervision object platform; generate a calling instruction and send the calling instruction to the gas company management platform of the government gas supervision object platform for implementation, wherein the calling instruction is configured to obtain pipeline supervision information corresponding to the plurality of inspection sub-routes, the pipeline supervision information including at least one of pipeline defective information and a pipeline inspection result of a first historical time period; generate an acquisition instruction based on the gas company management platform and send the acquisition instruction to the gas equipment object platform for implementation, wherein the acquisition instruction is configured to control gas appurtenant facilities deployed on the plurality of inspection sub-routes to acquire and upload facility supervision information; determine an inspection type parameter of each of the plurality of inspection sub-routes based on the pipeline supervision information and the facility supervision information, wherein the inspection type parameter includes at least one of drone inspection, robotic inspection, and manual inspection; determine an inspection assignment parameter based on the inspection type parameter; generate an inspection instruction and send the inspection instruction to the gas equipment object platform for implementation, wherein the inspection instruction is configured to control inspection equipment and/or an inspector to perform the inspection assignment parameter; during the inspection, in response to determining that an actual coverage of one or more of the inspection sub-routes satisfies a first preset condition, update the plurality of inspection sub-routes to obtain new inspection sub-routes, the new inspection sub-routes including uncovered sub-routes; adjust the inspection assignment parameter based on the uncovered sub-routes; send an updated inspection assignment parameter to the gas equipment object platform for implementation; and after the inspection is completed, send a current pipeline inspection result and the pipeline defective information corresponding to the new inspection sub-routes to the gas company management platform of the government gas supervision object platform for storage. The government gas supervision sensor network platform may perform downward bidirectional interaction with the government gas supervision object platform. The government gas supervision object platform may perform downward bidirectional interaction with the gas company sensor network platform. The government gas supervision object platform may include a gas company management platform. The government gas supervision object platform may be configured to store the plurality of inspection sub-routes and the pipeline supervision information, and execute the calling instruction issued by the government gas supervision management platform. The gas company management platform may be configured to obtain the inspection route. The gas company sensor network platform may perform downward bidirectional interaction with the gas equipment object platform. The gas equipment object platform may be configured to execute the acquisition instruction and the inspection instruction issued by the government gas supervision management platform.

One or more embodiments of the present disclosure provide an inspection device for smart gas supervision information. The inspection device may comprise at least one storage device and at least one processor. The at least one storage device may be configured to store computer instructions. The at least one processor may be configured to execute the computer instructions or part of the computer instructions to implement the inspection method for the smart gas supervision information.

One or more embodiments of the present disclosure provide a non-transitory computer-readable storage medium comprising computer instructions that, when read by a computer, may direct the computer to implement the inspection method for the smart gas supervision information.

The beneficial effects that can be brought about by the embodiments of the present application include, but are not limited to the following content. (1) A closed loop of information operation between a plurality of platforms of the system is formed and unified coordination and management is realized through the management platform, which can realize the informatization and intelligence of the inspection of supervision information. (2) The predicted inspection effect of different inspection type parameter and the predicted inspection time of objects to be inspected can be quickly and accurately predicted using a machine learning model, and the accuracy of the inspection model and the temporal model can be further improved by joint training the inspection model and the temporal model, making the predicted inspection time more accurate. (3) The predicted inspection effect of the inspection type parameter can be accurately predicted based on the pipeline supervision information and the facility supervision information, and then the inspection type parameter most suitable for inspection sub-routes can be determined. (4) The corresponding gas risk values of the inspection sub-routes can be accurately determined based on the count of gas accidents and severity of accidents of the inspection sub-routes in the historical time period, and then the second threshold can be determined based on the positive correlation, which makes the setting of the second threshold more reasonable. (5) The second preset condition can be accurately determined based on the first threshold and the second threshold, which can be used to filter the predicted inspection effect, and the reasonableness of the setting of the second threshold can be guaranteed from multiple perspectives based on the density, the data redundancy, or the fault correlation of gas appurtenant facilities of the inspection sub-routes. (6) By obtaining the plurality of inspection sub-routes and the corresponding pipeline supervision information and the facility supervision information, the inspection type parameters of the inspection sub-routes can be determined, then the inspection assignment parameters can be determined, and adjustment can be made according to the actual coverage in the inspection process, such that the inspection method for the smart gas supervision information can be realized by means of the interactions between the various platforms of the IoT system, which conducive to improving the efficiency of the inspection of the smart gas supervision information and reducing the waste of manpower and time in the inspection process.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 4 is a flowchart illustrating an exemplary process of determining a new target sub-route and an inspection type parameter of the new target sub-route according to some embodiments of the present disclosure;

DETAILED DESCRIPTION

Figure 1:
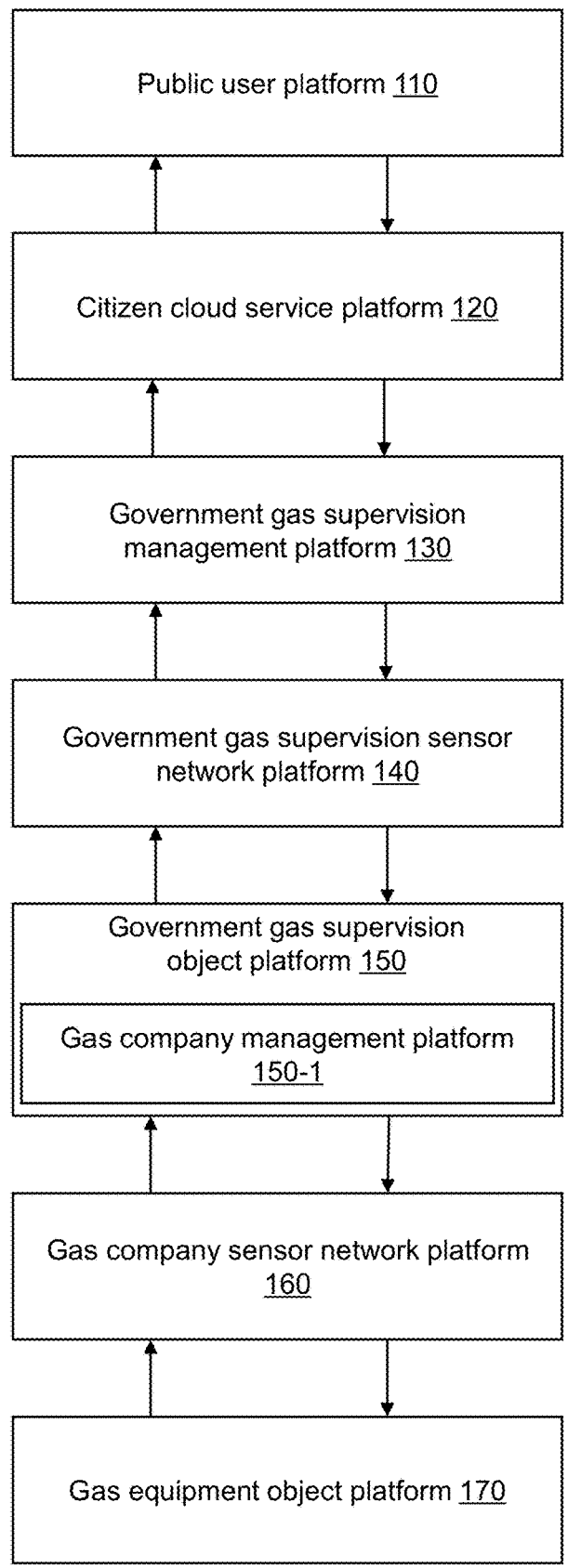
FIG. 1 is a schematic diagram illustrating a platform structure of an Internet of Things (IoT) system for smart gas supervision information according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios according to these drawings without creative labor. Unless obviously obtained from the context or the context illustrates otherwise, the same numeral in the drawings refers to the same structure or operation.

It should be understood that as used herein, the terms "system", "device", "unit" and/or "module" as used herein is a way to distinguish between different components, elements, parts, sections or assemblies at different levels. However, the words may be replaced by other expressions if other words accomplish the same purpose.

As shown in the present disclosure and in the claims, unless the context clearly suggests an exception, the words "a", "one", "a" and/or "the" do not refer specifically to the singular but may also include the plural. Generally, the terms "including" and "comprising" only suggest the inclusion of explicitly identified steps and elements that do not constitute an exclusive list, and the method or apparatus may also include other steps or elements.

Flowcharts are used in the present disclosure to illustrate operations performed by a system according to embodiments of the present disclosure. It should be appreciated that the preceding or following operations are not necessarily performed in an exact sequence. Instead, steps can be processed in reverse order or simultaneously. Also, it is possible to add other operations to these processes or remove a step or steps from them.

FIG. 1 is a schematic diagram illustrating a platform structure of an Internet of Things (IoT) system for smart gas supervision information according to some embodiments of the present disclosure.

In some embodiments, as shown in FIG. 1, the Internet of Things (IoT) system 100 for smart gas supervision information may include a public user platform 110, a citizen cloud service platform 120, a government gas supervision management platform 130, a government gas supervision sensor network platform 140, a government gas supervision object platform 150, a gas company sensor network platform 160, and a gas equipment object platform 170.

The public user platform 110 refers to a platform for interacting with users. The users are all citizens associated with smart gas (e.g., using smart gas). In some embodiments, the public user platform 110 may engage in a bidirectional exchange of information with the users. For example, the users may access information or communicate a need via the public user platform 110. In some embodiments, the public user platform 110 may be configured as a terminal device. For example, the public user platform 110 may be a smartphone, tablet, laptop, or the like, or any combination thereof.

In some embodiments, the public user platform 110 may perform bidirectional interaction with the citizen cloud service platform 120. For example, the citizen cloud service platform 120 may obtain a user demand from the public user platform 110 and upload relevant data corresponding to the user demand for feedback to the public user platform 110.

In some embodiments, acting as a primary platform, the public user platform 110 may be a smart gas primary network user platform. The smart gas primary network user platform refers to a platform that provides gas users with data related to gas usage and solutions to gas problems.

The citizen cloud service platform 120 refers to a platform that provides Internet services (e.g., data computation, control information, etc.) to the users. For example, the citizen cloud service platform 120 may provide the users with gas query, gas supervision, and other related services. In some embodiments, the citizen cloud service platform 120 may be configured as a computer cloud platform.

In some embodiments, acting as a primary platform, the citizen cloud service platform 120 may be a smart gas primary network service platform.

The government gas supervision management platform 130 refers to a platform for performing an inspection method for smart gas supervision information. In some embodiments, the government gas supervision management platform 130 may coordinate and harmonize the connection and collaboration between the functional platforms, and converge all information of the IoT, and provide the IoT operation system with sensing management and control management functions.

In some embodiments, the government gas supervision management platform 130 may be configured to: obtain an inspection route based on the gas company management platform; determine a plurality of inspection sub-routes by performing segmentation processing on the inspection route, and store the plurality of inspection sub-routes to the government gas supervision object platform; generate a calling instruction and send the calling instruction to the gas company management platform of the government gas supervision object platform for implementation, the calling instruction being configured to obtain pipeline supervision information corresponding to the plurality of inspection sub-routes, and the pipeline supervision information including at least one of pipeline defective information and a pipeline inspection result of a first historical time period; generate an acquisition instruction based on the gas company management platform and send the acquisition instruction to the gas equipment object platform for implementation, the acquisition instruction being configured to control gas appurtenant facilities deployed on the plurality of inspection sub-routes to acquire and upload facility supervision information; determine an inspection type parameter of each of the plurality of inspection sub-routes based on the pipeline supervision information and the facility supervision information, the inspection type parameter including at least one of drone inspection, robotic inspection, and manual inspection; determine an inspection assignment parameter based on the inspection type parameter; generate an inspection instruction and send the inspection instruction to the gas equipment object platform for implementation, the inspection instruction being configured to control inspection equipment and/or an inspector to perform the inspection assignment parameter; during the inspection, in response to determining that an actual coverage of one or more of the inspection sub-routes satisfies a first preset condition, update the plurality of inspection sub-routes to obtain new inspection sub-routes, the new inspection sub-routes including uncovered sub-routes; adjust the inspection assignment parameter based on the uncovered sub-routes; send an updated inspection assignment parameter to the gas equipment object platform for implementation; and after the inspection is completed, send a current pipeline inspection result and the pipeline defective information corresponding to the new inspection sub-routes to the gas company management platform of the government gas supervision object platform for storage.

In some embodiments, the government gas supervision management platform 130 may be further configured to: predict a predicted inspection effect of the inspection type parameter based on the pipeline supervision information and the facility supervision information, the predicted inspection effect including a predicted accuracy rate and a predicted coverage; and determine the inspection type parameter of each of the plurality of inspection sub-routes based on the predicted inspection effect that satisfies a second preset condition.

In some embodiments, the government gas supervision management platform 130 may be further configured to: in response to determining that the predicted inspection effect satisfying the second preset condition does not exist, determine at least one target sub-route and an adjustment type of the at least one target sub-route, the adjustment type including a first type corresponding to the predicted coverage being less than a first threshold, and a second type corresponding to the predicted accuracy rate being less than a second threshold; and in response to determining that the adjustment type is the first type, obtain at least one new target sub-route by adjusting the at least one target sub-route based on the predicted inspection effect corresponding to the at least one target sub-route.

In some embodiments, the government gas supervision management platform 130 may perform upward bidirectional interaction with the citizen cloud service platform 120 and perform downward bidirectional interaction with the government gas supervision sensor network platform 140. For example, the government gas supervision management platform 130 may obtain demand information of the users based on the citizen cloud service platform 120. As another example, the government gas supervision management platform 130 may obtain the inspection route via the government gas supervision sensor network platform 140.

In some embodiments, in response to acting as a primary platform, the government gas supervision management platform 130 may be a smart gas primary network management platform; in response to acting as a secondary platform, the government gas supervision management platform 130 may be a smart gas secondary network user platform.

The government gas supervision sensor network platform 140 refers to a functional platform that manages sensing communication for the government. In some embodiments, the government gas supervision sensor network platform 140 may be configured as a communication network or a gateway, etc. In some embodiments, the government gas supervision sensor network platform 140 may implement sensing communication for sensing information and sensing communication for controlling information.

In some embodiments, the government gas supervision sensor network platform 140 may perform downward bidirectional interaction with the government gas supervision object platform 150. For example, the government gas supervision sensor network platform 140 may obtain the inspection route from the government gas supervision object platform 150.

In some embodiments, in response to acting as a primary platform, the government gas supervision sensor network platform 140 may be a smart gas primary network sensor network platform; in response to acting as a secondary platform, the government gas supervision sensor network platform 140 may be a smart gas secondary network service platform.

The government gas supervision object platform 150 refers to an object platform that generates the sensing information and executes the controlling information. In some embodiments, the government gas supervision object platform 150 may be configured to store the plurality of inspection sub-routes and the pipeline supervision information, and execute the calling instruction issued by the government gas supervision management platform 130.

In some embodiments, the government gas supervision object platform 150 may include a gas company management platform 150-1.

The gas company management platform 150-1 refers to a comprehensive management platform for information related to gas companies. In some embodiments, the gas company management platform 150-1 may be configured to obtain the inspection route.

In some embodiments, the government gas supervision object platform 150 may perform downward bidirectional interaction with the gas company sensor network platform 160. For example, the government gas supervision object platform 150 may send a received acquisition instruction to the gas company sensor network platform 160.

In some embodiments, in response to acting as a primary platform, the government gas supervision object platform 150 may be a smart gas primary network object platform; in response to acting as a secondary platform, the government gas supervision object platform 150 may be a smart gas secondary network management platform. The smart gas primary network object platform may be configured as various types of gas in-home equipment of the gas users.

The gas company sensor network platform 160 refers to a comprehensive management platform for the sensing information of the gas companies. In some embodiments, the gas company sensor network platform 160 may be configured as the communication network or the gateway, etc. In some embodiments, the gas company sensor network platform 160 may implement the sensing communication for the sensing information and the sensing communication for the controlling information.

In some embodiments, the gas company sensor network platform 160 may perform downward bidirectional interaction with the gas equipment object platform 170. For example, the gas company sensor network platform 160 may send the received acquisition instruction to the gas equipment object platform 170 for implementation. After the implementation of the acquisition instruction is completed, the gas equipment object platform 170 may upload acquired facility supervision information to the gas company sensor network platform 160.

In some embodiments, in response to acting as a secondary platform, the gas company sensor network platform 160 may be a smart gas secondary network sensor network platform.

The gas equipment object platform 170 refers to a functional platform that executes control instructions. In some embodiments, the gas equipment object platform 170 may be configured as various types of inspection equipment, such as a drone, a robot, etc.

In some embodiments, the gas equipment object platform 170 may be configured to implement the acquisition instruction and the inspection instruction issued by the government gas supervision management platform 130.

In some embodiments, in response to acting as a secondary platform, the gas equipment object platform 170 may be a smart gas secondary network object platform. The smart gas secondary network object platform may be configured as various types of gas network equipment and monitoring equipment, such as a gas metering device, a pressure sensor, a temperature sensor, a flow rate sensor, a gas leakage detection device, and so on.

More descriptions regarding each of the above platforms may be found elsewhere in the present disclosure (e.g., the related descriptions of FIGS. 2-6).

In some embodiments of the present disclosure, an information operation closed loop can be formed between the public user platform, the citizen cloud service platform, the government gas supervision management platform, the government gas supervision sensor network platform, the government gas supervision object platform, the gas company sensor network platform, and the gas equipment object platform based on the IoT system for the smart gas supervision information, and coordinated and regular operation can be realized under the unified management of the government gas supervision management platform, which realizes the informatization and intellectualization of the inspection of the smart gas supervision information.

It should be noted that the above description of the IoT system 100 for smart gas supervision information and its modules is only for descriptive convenience and does not limit the present disclosure to the scope of the cited embodiments. It is understood that for a person skilled in the art, after understanding the principle of the system, it may be possible to arbitrarily combine individual modules or constitute a subsystem to connect with other modules without departing from this principle. In some embodiments, the public user platform 110, the citizen cloud service platform 120, the government gas supervision management platform 130, the government gas supervision sensor network platform 140, the government gas supervision object platform 150, the gas company sensor network platform 160, and the gas equipment object platform 170 may be different modules in one system, or one module may realize the functions of two or more modules described above. For example, the individual modules may share a common storage module, and the individual modules may each have a respective storage module. Such variations are within the scope of protection of the present disclosure.

Figure 2:
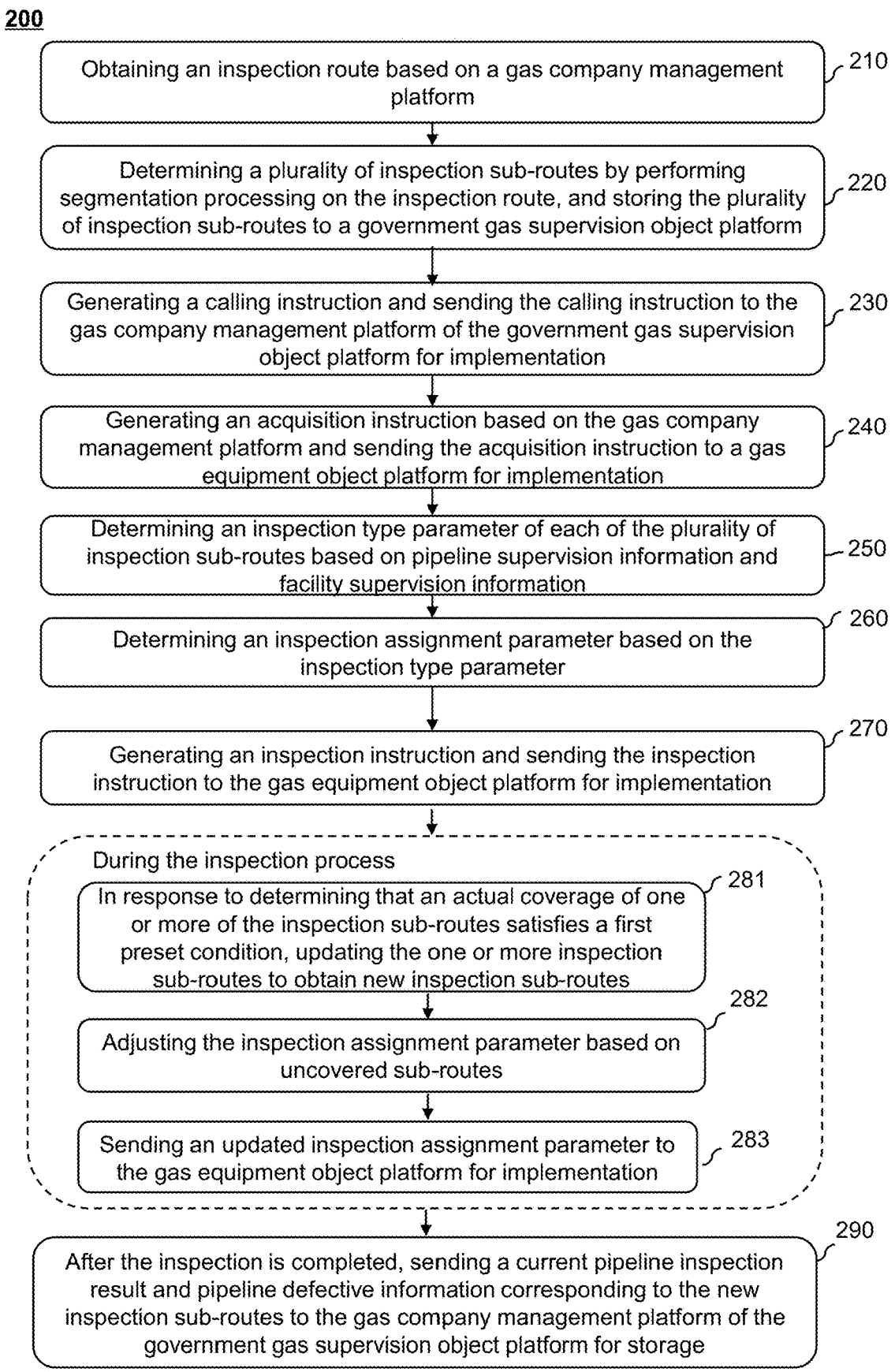
FIG. 2 is a flowchart illustrating an exemplary inspection method for smart gas supervision information according to some embodiments of the present disclosure.

FIG. 2 is a flowchart illustrating an exemplary inspection method for smart gas supervision information according to some embodiments of the present disclosure. As shown in FIG. 2, a process 200 may include the following operations. In some embodiments, the process 200 may be performed by the government gas supervision management platform 130.

In 210, an inspection route may be obtained based on a gas company management platform.

The inspection route refers to a route formed by a gas pipeline that needs to be inspected. For example, an inspection route S may be expressed as "①-②-③-④-⑤-⑥⑦-⑧-⑨-⑩", representing the inspection of a gas pipeline ① to a gas pipeline ⑩.

In some embodiments, the government gas supervision management platform may obtain the inspection route based on the gas company management platform in various ways. For example, the government gas supervision management platform may obtain, based on the gas company management platform, all the gas pipelines in a region where the inspection needs to be performed, and obtain the inspection route by traversing all the gas pipelines.

In 220, a plurality of inspection sub-routes may be determined by performing segmentation processing on the inspection route, and the plurality of inspection sub-routes may be stored to the government gas supervision object platform.

The plurality of inspection sub-routes refer to sub-routes that constitutes the inspection route. For example, the inspection sub-routes of the inspection route S may include "①-②-③-④ and ⑤-⑥-⑦-⑧-⑨-⑩".

In some embodiments, the government gas supervision management platform may determine the plurality of inspection sub-routes by performing the segmentation processing on the inspection route.

For example, the inspection route may include a main pipeline branch and a bypass pipeline branch. The government gas supervision management platform may divide the inspection route into a plurality of regions along the main pipeline branch according to a preset length by starting from a start point (a start point of a first gas pipeline of the main pipeline branch) of the main pipeline branch of the inspection route, one of the plurality of regions corresponding to one of the plurality of inspection sub-routes. The bypass pipeline branch may be categorized to an inspection sub-route having the closest distance to the bypass pipeline branch. The distance refers to a segment from a midpoint of the bypass pipeline branch to a midpoint of the inspection sub-route. For example, the inspection route S may be divided into an inspection sub-route $S_1$ "①-②-③-④", an inspection sub-route $S_2$ "⑤-⑥", an inspection sub-route $S_3$ "⑦-⑧-⑨-⑩" through the above process.

The main pipeline branch and the bypass pipeline branch may be determined by manual presetting. The preset length may be preset manually or set by system default, such as 200 m, 500 m, etc.

In some embodiments, the government gas supervision management platform may send the plurality of inspection sub-routes to the government gas supervision object platform through the government gas supervision sensor network platform and store the plurality of inspection sub-routes by the government gas supervision object platform.

In 230, a calling instruction may be generated and sent to the gas company management platform of the government gas supervision object platform for implementation.

The calling instruction refers to an instruction to call pipeline supervision information. In some embodiments, the calling instruction may be configured to obtain the pipeline supervision information corresponding to the plurality of inspection sub-routes.

The pipeline supervision information refers to relevant information obtained from a historical inspection gas pipeline. In some embodiments, the pipeline supervision information may include at least one of pipeline defective information, and a pipeline inspection result of a first historical time period.

In some embodiments, the pipeline supervision information obtained during each historical inspection may be automatically stored in the government gas supervision object platform by the government gas supervision management platform through the government gas supervision sensor network platform.

The pipeline defective information refers to information related to the poor condition of a gas pipeline. In some embodiments, the pipeline defective information may include a defective position, such as a position of a region where a gas pipeline that is unsuitable for a robot to pass through is located, etc.

The pipeline inspection result refers to a result of an inspection performed on the gas pipeline. In some embodiments, the pipeline inspection result may include an inspected gas pipeline, whether the inspected gas pipeline has a fault, and a fault type (including a gas leakage, aging of the gas pipeline, etc.).

In some embodiments, the pipeline inspection result may also include a facility inspection result of gas appurtenant facilities of the gas pipeline.

The gas appurtenant facilities refer to relevant monitoring devices attached to the gas pipeline, such as a gas metering device, a pressure sensor, a temperature sensor, a flow rate sensor, a gas leakage detection device, and the like.

The facility inspection result refers to a result of inspections of the gas appurtenant facilities. For example, the facility inspection result may include an inspected gas appurtenant facility, whether the inspected gas appurtenant facility has a fault, and a fault type (including damage to the gas appurtenant facilities, aging of the gas appurtenant facilities, poor performance of the gas appurtenant facilities, etc.).

The first historical time period refers to a time period in the past, such as the past year, the first half of a year, etc. In some embodiments, the duration of the first historical time period may be positively correlated with remaining computing resources of the government gas supervision management platform. For example, if the remaining computing resources of the government gas supervision management platform is more (e.g., not less than 50%), the pipeline inspection results of the past year may be called; if the remaining computing resources of the government gas supervision management platform are less (less than 50%), the pipeline inspection results of the past six months may be called.

The remaining computing resources refer to the remaining compute capacity of the government gas supervision management platform. In some embodiments, the remaining computing resources may be determined based on an average occupancy of all central processing units (CPUs) within the government gas supervision management platform.

The average occupancy refers to an average of a plurality of occupancies for the plurality of CPUs. The occupancy refers to a proportion of total resources used by the CPU to perform tasks. The occupancy may be expressed as a percentage from 0% to 100%. In some embodiments, the remaining computing resources may be represented by 1 minus the average occupancy.

In some embodiments, the government gas supervision management platform may automatically generate the calling instruction based on a manually preset instruction template and send the calling instruction to the government gas supervision object platform for implementation through the government gas supervision sensor network platform. The government gas supervision object platform may call, based on the calling instruction, the pipeline supervision information corresponding to the plurality of inspection sub-routes stored in the government gas supervision object platform.

In 240, an acquisition instruction may be generated based on the gas company management platform and sent to the gas equipment object platform for implementation.

The acquisition instruction refers to an instruction for obtaining facility supervision information. In some embodiments, the acquisition instruction may be configured to control the gas appurtenant facilities deployed on the plurality of inspection sub-routes to acquire and upload the facility supervision information. The plurality of gas appurtenant facilities may be deployed on a single inspection sub-route.

The facility supervision information refers to information related to the gas appurtenant facilities. In some embodiments, the facility supervision information may include a deployment position (e.g., a regulator station, a gate station, etc.) of the gas appurtenant facilities, a facility type (e.g., a gas metering device, a pressure sensor, etc.) of the gas appurtenant facilities, and the facility inspection result of the first historical time period.

In some embodiments, the facility supervision information may be acquired and uploaded autonomously by the gas appurtenant facilities.

In some embodiments, the government gas supervision management platform may automatically generate the acquisition instruction based on the manually preset instruction template and send the acquisition instruction to the gas equipment object platform for implementation through the government gas supervision sensor network platform via the government gas supervision object platform and the gas company sensor network platform. Based on the acquisition instruction, the gas equipment object platform may control the gas appurtenant facilities deployed on the plurality of inspection sub-routes to acquire the facility supervision information and upload the facility supervision information to the government gas supervision management platform.

In 250, determining an inspection type parameter of each of the plurality of inspection sub-routes may be determined based on pipeline supervision information and facility supervision information.

The inspection type parameter refers to a subject type that performs the inspection. In some embodiments, the inspection type parameter may include at least one of a drone inspection, a robotic inspection, and a manual inspection.

In some embodiments, each of the plurality of inspection sub-routes may have a corresponding inspection type parameter. For example, the inspection type parameters of the inspection sub-routes $S_1$, $S_2$, and $S_3$ may be the drone inspection, the robotic inspection, and the manual inspection, respectively.

In some embodiments, the government gas supervision management platform may determine the inspection type parameter of each of the plurality of inspection sub-routes in various ways based on the pipeline supervision information and the facility supervision information. For example, the government gas supervision management platform may determine the inspection type parameter based on the pipeline supervision information and the facility supervision information by vector matching.

In some embodiments, the government gas supervision management platform may construct a first vector database based on the historical data, the first vector database including a plurality of first reference vectors and corresponding reference inspection type parameters and reference inspection coverage. One of the plurality of first reference vectors may be constructed based on historical pipeline supervision information and historical facility supervision information of a historical inspection sub-route. Each of the plurality of first reference vectors may characterize the corresponding historical inspection sub-route. The reference inspection type parameters and the reference inspection coverage may be corresponding historical actual inspection type parameters and historical actual inspection coverage.

In some embodiments, the government gas supervision management platform may construct a first target vector based on the pipeline supervision information and the facility supervision information. The government gas supervision management platform may retrieve, in the first vector database, one or more first reference vectors of which vector distances from the first target vector are less than a first distance threshold, and determine, from the one or more first reference vectors, a corresponding first reference vector with the highest reference inspection coverage, and determine the reference inspection type parameter corresponding thereto as a current inspection type parameter.

The vector distance may be any one of a Euclidean distance, a cosine distance, a Mahalanobis distance, and the like. The first distance threshold may be determined manually based on priori experience or historical data.

The reference inspection coverage refers to an inspection coverage used for reference. The inspection coverage refers to a coverage of inspected routes. In some embodiments, the inspection coverage may be represented by a ratio of a length of the inspected routes to a total length of the plurality of inspection sub-routes. The total length of the plurality of inspection sub-routes refers to a sum of lengths of primary gas pipeline and secondary gas pipelines included in the plurality of inspection sub-routes.

In some embodiments, the government gas supervision management platform may predict a predicted inspection effect of the inspection type parameter based on the pipeline supervision information and the facility supervision information; and determine the inspection type parameter of each of the plurality of inspection sub-routes based on the predicted inspection effect that satisfies a second preset condition.

The predicted inspection effect refers to a predicted effect of inspecting the gas pipeline based on the inspection type parameter. In some embodiments, the predicted inspection effect may include a predicted accuracy rate and a predicted coverage.

The predicted accuracy rate refers to an inspection accuracy which is predicted. The inspection accuracy refers to an accuracy of the pipeline inspection result. In some embodiments, the predicted accuracy rate may be represented by a consistent degree between the predicted pipeline inspection result and an actual pipeline operation result in a future time period. The consistent degree may be determined based on the vector distance, a similarity, or the like.

The pipeline operation result refers to an actual operation result of the gas pipeline. For example, the pipeline operation result may include whether the gas pipeline and the gas appurtenant facilities have a fault and a fault type.

The future time period refers to a time period in the future of the current time. In some embodiments, the future time period may be manually preset or set by system default, such as one week in the future, one month in the future, etc.

The predicted coverage refers to a predicted inspection coverage. In some embodiments, the predicted coverage may be represented by a ratio of a predicted length of routes that may be inspected to a total length of the inspection sub-routes. More descriptions regarding the inspection coverage may be found in the related description above.

Different inspection type parameters may correspond to different predicted inspection effects.

In some embodiments, the government gas supervision management platform may predict the predicted inspection effect of the inspection type parameter in various ways based on the pipeline supervision information and the facility supervision information. For example, for a certain inspection sub-route which is subjected to the manual inspection many times (assuming m times), each historical manual inspection may correspond to a historical predicted pipeline inspection result, and a historical actual pipeline operation result of each historical manual inspection may be known based on the historical data.

Counting times (assuming n) that the historical predicted pipeline inspection results and the historical actual pipeline operation results are not consistent (e.g., the historical predicted pipeline inspection result has not fault, but the historical actual pipeline operation result has fault) in m historical manual inspections, an error rate may be n/m, and a difference of 1 minus the error rate may be determined as the predicted accuracy rate of the manual inspection. Taking a union set of inspected gas pipelines from m historical manual inspections, the total length of the gas pipelines in the union set may be calculated, and a ratio of the total length of the gas pipelines in the union set to the total length of the inspection sub-route may be determined the predicted coverage of the manual inspection.

Similarly, the predicted accuracy rate and the predicted coverage of the robotic inspection, and the predicted accuracy rate and the predicted coverage of the drone inspection may also be obtained through the above process. If no historical data exists for an inspection type parameter (e.g., the robotic inspection), i.e., the inspection sub-route is not subjected to the robotic inspection, a preset value (preset by human or by the system, e.g., 80%) may be used as the predicted accuracy rate and the predicted coverage.

In some embodiments, the government gas supervision management platform may determine the predicted inspection effect based on the pipeline supervision information, the facility supervision information, and a pipeline distribution through an inspection model.

The pipeline distribution refers to a situation relating to a distribution position of the gas pipeline. In some embodiments, the pipeline distribution may be represented by a vector sequence including coordinates of midpoint positions of a plurality of gas pipelines. For example, $\{(x_1,y_1), (x_2,y_2), \ldots, (x_{10}, y_{10})\}$, represents that in the inspection route S, the coordinates of the midpoint position of the gas pipeline ① may be $(x_1,y_1)$, and so on, the coordinates of the midpoint position of the gas pipeline ⑩ may be $(x_{10},y_{10})$. In some embodiments, the pipeline distribution may also be represented by a graph structure, such as a graph structure with start and end points of each of the gas pipelines as nodes and the gas pipelines as edges.

In some embodiments, the government gas supervision management platform may obtain the pipeline distribution of the plurality of inspection sub-route based on a gas pipeline distribution map. The gas pipeline distribution map may be manually uploaded to the government gas supervision management platform in advance.

The inspection model refers to a model for determining the predicted inspection effect. In some embodiments, the inspection model may be a machine learning model, such as neural Networks (NN), etc.

In some embodiments, the government gas supervision management platform may input the pipeline supervision information, the facility supervision information, and the pipeline distribution of the plurality of inspection sub-routes into the inspection model, and output, through different output layers of the inspection model, the predicted inspection effects of different inspection type parameters.

Figure 3:
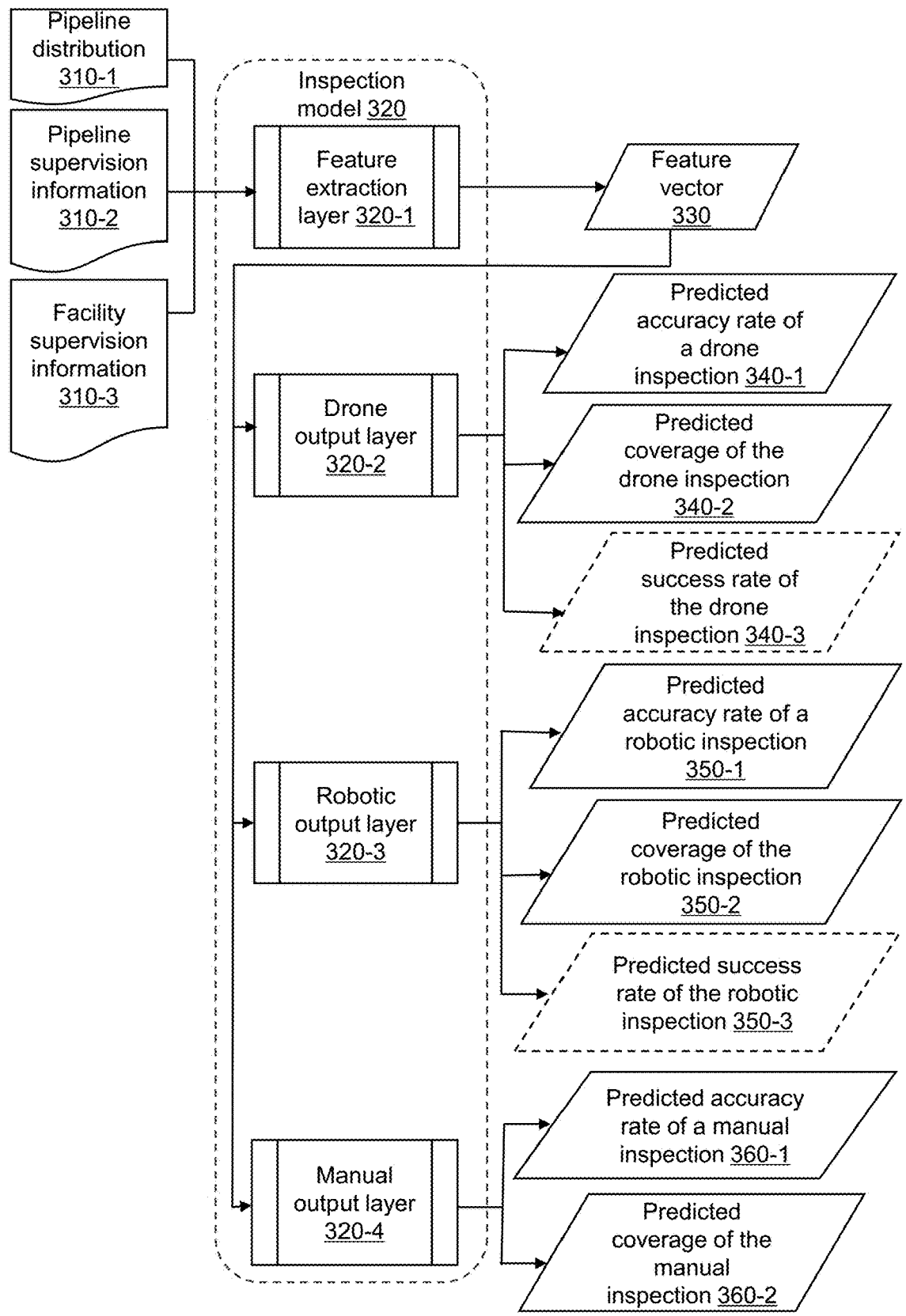
FIG. 3 is a schematic diagram illustrating an exemplary inspection model according to some embodiments of the present disclosure.

More descriptions regarding the inspection model may be found elsewhere in the present disclosure (e.g., the related descriptions of FIG. 3).

In some embodiments of the present disclosure, the machine learning model can quickly and accurately predict the predicted inspection effects of different inspection type parameters, which is conducive to the subsequent reasonable determination of the inspection type parameters of the plurality of inspection sub-routes.

The second preset condition refers to a condition that the predicted inspection effect needs to be met when the inspection type parameter is determined.

In some embodiments, the second preset condition may include that the predicted accuracy rate is greater than a second threshold, and the predicted coverage is greater than a first threshold.

The second threshold refers to a minimum critical value of the predicted accuracy rate when the inspection type parameter is determined, such as 80%.

In some embodiments, the plurality of inspection sub-routes may correspond to one or more second thresholds. The one or more second thresholds may be positively correlated with gas risk values corresponding to the plurality of inspection sub-routes.

The gas risk value refers to a numerical value that reflects the gas risk. In some embodiments, the gas risk value may be determined based on a count of gas accidents and severities of accidents of the plurality of inspection sub-routes during a second historical time period. For example, the gas risk value may be a sum of the severities of all the gas accidents during the second historical time period.

The second historical time period refers to a time period in the past. In some embodiments, the second historical time period may be manually preset or set by system default, such as the last two years.

The count of gas accidents refers to a number of gas accidents, such as 10 times, 20 times, and so on. The gas accident refers to a gas-related safety accident, such as a gas leakage, gas poisoning, a gas explosion, and so on.

In some embodiments, the government gas supervision management platform may obtain the count of gas accidents in the second historical time period by counting based on historical data.

The severities of accidents refer to degrees of severities of the gas accidents. In some embodiments, the severities of accidents may be represented by a scale of 1-10. The higher the scale, the more severe the gas accident. In some embodiments, the severities of accidents may be determined by a technician based on historical experience.

In some embodiments, the second threshold may be positively correlated with the gas risk value corresponding to the inspection sub-route. The greater the gas risk value, the higher the second threshold. The gas risk values corresponding to different inspection sub-routes may be the same or different, and the corresponding second threshold values may be the same or different.

In some embodiments of the present disclosure, the gas risk values corresponding to the plurality of inspection sub-route can be accurately determined based on the count of gas accidents and the severities of accidents of the plurality of inspection sub-routes in the historical time period, and then the second threshold can be determined based on the positive correlation, making the setting of the second threshold more reasonable.

The first threshold refers to a minimum critical value of the predicted coverage when the inspection type parameter is determined, such as 80%. In some embodiments, the first threshold may be determined based on at least one of a density, a data redundancy, or a fault correlation of the gas appurtenant facilities of the plurality of inspection sub-routes.

For example, the government gas supervision management platform may determine the first threshold by querying a first preset table based on at least one of the density, the data redundancy, or the fault correlation. The first preset table may include a correspondence between at least one of the density, the data redundancy, or the fault correlation and the first threshold. The correspondence may include a positive correlation between the first threshold and the density, a negative correlation between the first threshold and the data redundancy, and a negative correlation between the first threshold and the fault correlation. The first preset table may be determined based on priori experience or historical data.

The density refers to a degree of concentration reflecting the distribution of the gas appurtenant facilities. The density may be expressed by a count of the gas appurtenant facilities per unit length of gas pipeline. In some embodiments, the density of the gas appurtenant facilities in the plurality of inspection sub-route may be positively correlated with the first threshold. The greater the density, the higher the likelihood of a fault. The greater the inspection coverage, the greater the first threshold.

The data redundancy refers to an overlap degree in the data collected by the gas appurtenant facilities. For example, if the data collected by 3 of 10 gas appurtenant facilities are duplicated, the data redundancy may be 30%. In some embodiments, the data redundancy of the gas appurtenant facilities of the plurality of inspection sub-routes may be negatively correlated with the first threshold. The greater the data redundancy, the greater the overlap degree of the data. The smaller the inspection coverage, the smaller the first threshold.

The fault correlation refers to a correlation degree of faults occurring at the gas appurtenant facilities. The fault correlation may be represented by a historical frequency of simultaneous faults of the gas appurtenant facilities. For example, if there are 70 of 100 historical inspections where the gas appurtenant facilities have a fault at the same time, the fault correlation may be 70%.

In some embodiments, the fault correlation of the gas appurtenant facilities of the plurality of inspection sub-route may be negatively correlated with the first threshold. The greater the fault correlation, the greater the accuracy of determining whether the associated other gas appurtenant facilities have a fault by whether one gas appurtenant facility has a fault, and the appropriately smaller the inspection coverage (only one of the gas appurtenant facilities needs to be inspected), the smaller the first threshold.

In some embodiments, the government gas supervision management platform may determine the predicted inspection effect of which the predicted accuracy rate is greater than the second threshold and the predicted coverage is greater than the first threshold as the predicted inspection effect that satisfies the second preset condition.

In some embodiments of the present disclosure, the second preset condition can be accurately determined according to the first threshold and the second threshold for filtering the predicted inspection effect, and the reasonableness of the setting of the first threshold can be guaranteed from a plurality of perspectives according to the density, the data redundancy, or the fault correlation of the gas appurtenant facilities of the plurality of inspection sub-routes, which in turn facilitates the subsequent accurate determination of the inspection type parameters of the plurality of inspection sub-routes.

In some embodiments, in response to determining that there is only one predicted inspection effect that satisfies the second preset condition, the government gas supervision management platform may determine the inspection type parameter corresponding to the predicted inspection effect as the inspection type parameter of the inspection sub-route.

In response to determining that there are a plurality of predicted inspection effects that satisfy the second preset condition, the government gas supervision management platform may determine the inspection type parameter corresponding to the predicted inspection effect with the highest predicted accuracy rate of the plurality of predicted inspection effects that satisfy the second preset condition as the inspection type parameter of the inspection sub-route, or may determine the inspection type parameter with the highest inspection success rate of the inspection type parameters corresponding to the plurality of predicted inspection effects that satisfy the second preset condition as the inspection type parameter of the inspection sub-route.

The inspection success rate refers to a probability that the inspection equipment may successfully pass through an obstacle area (e.g., a heavily shaded area with plants) and complete the inspection successfully (without getting stuck or damaged in the process). The inspection success rate of the robotic inspection and the drone inspection may be obtained from the output of the inspection model. More descriptions may be found elsewhere in the present disclosure (e.g., the related descriptions of FIG. 3).

In some embodiments of the present disclosure, the predicted inspection effect of the inspection type parameter can be accurately predicted based on the pipeline supervision information and the facility supervision information, and then the inspection type parameters that are most suitable for the plurality of inspection sub-routes can be determined from the predicted inspection effect that satisfies the second preset condition, which is conducive to the effective implementation of subsequent inspection operation.

In 260, an inspection assignment parameter may be determined based on the inspection type parameter.

The inspection assignment parameter refers to an assignment combination of the inspection equipment or an inspector to the inspection sub-route. In some embodiments, the inspection assignment parameter may be represented by a sequence consisting of matched pairs of the inspection equipment or the inspector with the inspection sub-routes. For example, the inspection assignment parameter may be {(drone 1, inspection sub-route $S_1$), (robot 1, inspection sub-route $S_2$), (drone 2, inspection sub-route $S_3$), (inspector 1, inspection sub-route $S_4$)}, which represents that the drone 1, the robot 1, the drone 2, and the inspector 1 are used for the inspection of the inspection sub-route $S_1$, the inspection sub-route $S_2$, the inspection sub-route $S_3$, and the inspection sub-route $S_4$, respectively.

The inspection equipment refers to equipment used to perform the inspection operation. In some embodiments, the inspection equipment may include the drone and the robot.

The inspector refers to a person used to perform the inspection operation.

In some embodiments, the inspection equipment or the inspector may correspond to the inspection type parameter. For example, if the inspection type parameter of the inspection sub-route is the drone inspection, the drone may carry out the inspection operation of the inspection sub-route; if the inspection type parameter of the inspection sub-route is the robotic inspection, the robot may carry out the inspection operations of the inspection sub-route; if the inspection type parameter of the inspection sub-route is the manual inspection, the inspector may carry out the inspection operation of the inspection sub-route.

In some embodiments, the government gas supervision management platform may determine the inspection assignment parameter based on the inspection type parameter in various ways. For example, the government gas supervision management platform may randomly assign the corresponding inspection equipment or inspector to the inspection sub-route based on the inspection type parameter of the inspection sub-route, traverse all the inspection sub-routes, and determine the inspection assignment parameter.

For example, if the inspection type parameter of the inspection sub-route $S_1$ is the drone inspection, one drone may be randomly selected from drones 1-10 to be assigned to $S_1$; if the inspection type parameter of the inspection sub-route $S_2$ is the robotic inspection, and one robot may be randomly selected from robots 1-8 to be assigned to $S_2$; if the inspection type parameter of the inspection sub-route $S_3$ is also the robotic inspection, one robot may still be randomly selected from robots 1-8 (with preference from robots unassigned to $S_2$) to be assigned to $S_3$; if the inspection type parameter of the inspection sub-route $S_4$ is the manual inspection, one inspector may be randomly selected from inspectors 1-3 to be assigned to $S_4$, and all the inspection sub-routes may be traversed, and the inspection assignment parameter may be determined.

One inspection equipment or one inspector may be assigned to one or more inspection sub-routes. Different inspection equipment or different inspectors may be prioritized for assignment to different inspection sub-routes. If a count of the inspection sub-routes of the same inspection type parameter is less than a corresponding count of the inspection equipment or the inspectors (e.g., there are 20 inspection sub-routes that the inspection type parameter is the drone inspection, and 30 drones), a plurality of inspection equipment or inspectors may be assigned to the same inspection sub-route.

In some embodiments, the government gas supervision management platform may divide the plurality of inspection sub-routes into three categories of objects to be inspected based on the inspection type parameter, determine candidate assignment parameters of the three categories of objects to be inspected, and thus determine a predicted inspection time; and determine the inspection assignment parameter based on the predicted inspection time. More descriptions may be found elsewhere in the present disclosure (e.g., the related description of FIG. 5).

In 270, an inspection instruction may be generated and sent to the gas equipment object platform for implementation.

The inspection instruction refers to an instruction that performs the inspection assignment parameter. In some embodiments, the inspection instruction may be configured to control the inspection equipment and/or the inspector to perform the inspection assignment parameter.

In some embodiments, the government gas supervision management platform may automatically generate the inspection instruction based on the manually preset instruction template and send the inspection instruction to the gas equipment object platform for implementation through the government gas supervision sensor network platform and the gas company sensor network platform. The gas equipment object platform may control the inspection equipment and/or the inspector to implement the inspection assignment parameter based on the inspection instruction.

During the inspection process, the government gas supervision management platform may perform operations 281-283.

In 281, in response to determining that an actual coverage of one or more inspection sub-routes satisfies a first preset condition, the one or more inspection sub-routes may be updated to obtain new inspection sub-routes.

The actual coverage refers to an actual inspection coverage of the inspection sub-routes during the inspection process. In some embodiments, the actual coverage may be represented by a ratio of a length of inspected pipelines to the total length of the inspection sub-route, such as 70%.

The first preset condition refers to a condition to be met by the actual coverage when determining whether to the inspection sub-route. In some embodiments, the first preset condition may be that the actual coverage is less than the first threshold.

More descriptions regarding the inspection coverage and the first threshold may be found in the related descriptions above.

The new inspection sub-routes refer to updated inspection sub-routes. In some embodiments, the new inspection sub-routes may include uncovered sub-routes.

The uncovered sub-routes refer to inspection sub-routes consisting of the uninspected gas pipelines.

In some embodiments, when the actual coverage of the inspection sub-routes satisfies the first preset condition, the government gas supervision management platform may subdivide the inspection sub-routes of which the actual coverage is less than the first threshold, determine the uncovered sub-routes based on the uninspected gas pipelines, and other inspection sub-routes that do not satisfy the first preset condition may maintain the original division, thereby obtaining the new inspection sub-routes.

For example, the inspection route S may be divided into an inspection sub-route $S_1$ "①-②-③-④", an inspection sub-route $S_2$ "⑤-⑥", and an inspection sub-route $S_3$ "⑦-⑧-⑨-⑩". An actual coverage of the inspection sub-route $S_1$ may be 70%, which is less than the first threshold of 80%, and satisfies the first preset condition, then the inspection sub-route $S_1$ may be subdivided that an uninspected gas pipeline ① and an uninspected gas pipeline ② are categorized into an uncovered sub-route $S_{11}$ "①-②", and an inspected gas pipeline ③ and an inspected gas pipeline ④ are categorized into a new inspection sub-route $S_{12}$ "③-④", i.e., $S_1$ may be subdivided into $S_{11}$ and $S_{12}$. An actual coverage of the inspection sub-route $S_2$ and the inspection sub-route $S_3$ may be 90% and 85%, respectively, which are greater than the first threshold of 80%, and do not satisfy the first preset condition, then the original division may be maintained. As a result, the new inspection sub-route may include $S_{11}$ and $S_{12}$.

In 282, the inspection assignment parameter may be adjusted based on uncovered sub-routes.

In some embodiments, the government gas supervision management platform may adjust the inspection assignment parameter based on the uncovered sub-routes in various ways. For example, the government gas supervision management platform may assign the inspectors directly to the uncovered sub-routes for inspection. For example, an original inspection assignment parameter {(drone 1, inspection sub-route $S_1$), (robot 1, inspection sub-route $S_2$), (drone 2, inspection sub-route $S_3$)}, $S_1$ may be subdivided into $S_{11}$ and $S_{12}$, $S_{11}$ being the uncovered sub-route, the inspection assignment parameter may be adjusted as {(inspector 1, new inspection sub-route $S_{11}$), (drone 1, new inspection sub-route $S_{12}$), (robot 1, inspection sub-route $S_2$), (drone 2, inspection sub-route $S_3$)}. More descriptions regarding the manner of adjusting the inspection assignment parameter may be found elsewhere in the present disclosure (e.g., the related descriptions of FIG. 5).

In 283, an updated inspection assignment parameter may be sent to the gas equipment object platform for implementation.

In some embodiments, the government gas supervision management platform may send the updated inspection assignment parameter to the gas equipment object platform for implementation through the government gas supervision sensor network platform and the gas company sensor network platform. The gas equipment object platform may control the inspection equipment and/or the inspector to perform the inspection operation based on the updated inspection assignment parameter.

In 290, after the inspection is completed, a current pipeline inspection result and pipeline defective information corresponding to the new inspection sub-routes may be sent to the gas company management platform of the government gas supervision object platform for storage.

In some embodiments, the pipeline defective information corresponding to the new inspection sub-routes may include a defective position corresponding to each of the new inspection sub-routes, and the original inspection type parameters corresponding to the new inspection sub-routes may be noted (i.e., noting whether the robot or the drone is unable to reach the defective position corresponding to each of the new inspection sub-routes).

In some embodiments, the government gas supervision management platform may send the current pipeline inspection result and the pipeline defective information corresponding to the new inspection sub-routes to the government gas supervision object platform of the gas company management platform for storage through the government gas supervision sensor network platform.

In some embodiments of the present disclosure, by obtaining the plurality of inspection sub-routes and the corresponding pipeline supervision information and facility supervision information thereof, the inspection type parameter of each of the plurality of inspection sub-routes is determined, and then the inspection assignment parameter is determined, and adjustment is made according to the actual coverage in the inspection process, such that the inspection method for the smart gas supervision information is realized by means of the interaction between the various platforms of the IoT system, which is conducive to improving the inspection efficiency of the smart gas supervision information and reducing the waste of manpower and time in the inspection process.

It should be noted that the foregoing description of the process 200 is intended to be exemplary and illustrative only and does not limit the scope of application of the present disclosure. For a person skilled in the art, various corrections and changes can be made to the process 200 under the guidance of the present disclosure. However, such corrections and changes remain within the scope of the present disclosure.

FIG. 3 is a schematic diagram illustrating an exemplary inspection model according to some embodiments of the present disclosure.

In some embodiments, an inspection model 320 may include a feature extraction layer 320-1, a drone output layer 320-2, a robotic output layer 320-3, and a manual output layer 320-4, as shown in FIG. 3.

More descriptions regarding the inspection model may be found elsewhere int the present disclosure (e.g., the related descriptions of FIG. 2).

The feature extraction layer 320-1 refers to a model used to determine a feature vector. In some embodiments, the feature extraction layer may be a machine learning model, such as deep neural networks (DNN).

In some embodiments, as shown in FIG. 3, an input of the feature extraction layer may include a pipeline distribution 310-1, pipeline supervision information 310-2, and facility supervision information 310-3 of a plurality of inspection sub-routes, and an output of the feature extraction layer may include the feature vector 330.

More descriptions regarding the pipeline distribution, the pipeline supervision information, and the facility supervision information may be found elsewhere in the present disclosure (e.g., the related descriptions of FIG. 2).

The feature vector refers to a vector that characterizes the features of the plurality of inspection sub-routes. In some embodiments, the feature vector refers to a vector including the pipeline distribution, the pipeline supervision information, and the facility supervision information.

The drone output layer 320-2 refers to a model used to determine a predicted inspection effect of a drone inspection. In some embodiments, the drone output layer may be a machine learning model, such as convolutional neural networks (CNNs).

In some embodiments, as shown in FIG. 3, an input of the drone output layer 320-2 may include the feature vector 330, and an output of the drone output layer 320-2 may include a predicted accuracy rate 340-1 of a drone inspection and a predicted coverage 340-2 of the drone inspection.

The predicted accuracy rate (or a predicted coverage) of the drone inspection refers to a predicted accuracy rate (or a predicted coverage) obtained for an inspection sub-route using an inspection type parameter of the drone inspection.

The robotic output layer 320-3 refers to a model that is used to determine a predicted inspection effect of a robotic inspection. In some embodiments, the robotic output layer may be a machine learning model, such as the CNNs.

In some embodiments, as shown in FIG. 3, an input of the robotic output layer 320-3 may include the feature vector 330, and an output of the robotic output layer 320-3 may include a predicted accuracy rate 350-1 of the robotic inspection and a predicted coverage 350-2 of the robotic inspection.

The predicted accuracy rate (or the predicted coverage) of the robotic inspection refers to a predicted accuracy rate (or a predicted coverage) obtained for an inspection sub-route using an inspection type parameter of the robotic inspection.

The manual output layer 320-4 refers to a model that is used to determine a predicted inspection effect of a manual inspection. In some embodiments, the manual output layer may be a machine learning model, such as the CNNs.

In some embodiments, as shown in FIG. 3, an input of the manual output layer 320-4 may include the feature vector 330, and an output of the manual output layer 320-4 may include a predicted accuracy rate 360-1 of the manual inspection and a predicted coverage 360-2 of the manual inspection.

The predicted accuracy rate (or the predicted coverage) of the manual inspection refers to a predicted accuracy rate (or a predicted coverage) obtained for an inspection sub-route using an inspection type parameter of the manual inspection.

More descriptions regarding the drone inspection, the robotic inspection, the manual inspection, the inspection type parameter, the predicted accuracy rate, and the predicted coverage may be found elsewhere in the present disclosure (e.g., the related descriptions of FIG. 2).

In some embodiments, as shown in FIG. 3, the output of the drone output layer 320-2 may also include a predicted success rate 340-3 of the drone inspection, and the output of the robotic output layer 320-3 may also include a predicted success rate 350-3 of the robotic inspection.

The predicted success rate refers to an inspection success rate which is predicted. The predicted success rate of the robotic inspection (or the drone inspection) refers to a predicted success rate obtained for an inspection sub-route using the inspection type parameter of the robotic inspection (or the drone inspection).

More descriptions regarding the inspection success rate may be found elsewhere in the present disclosure (e.g., the related descriptions of FIG. 2).

In some embodiments of the present disclosure, the predicted success rate of the drone inspection and the robotic inspection can be accurately determined with the drone output layer and the robotic output layer, which is conducive to the subsequent reasonable selection of the inspection type parameter of the inspection sub-route.

In some embodiments, the government gas supervision management platform may train the inspection model based on a plurality of first training samples with first labels. The first training samples may include sample pipeline distributions, sample pipeline supervision information, and sample facility supervision information of sample inspection sub-routes. The first labels may include actual inspection accuracies and actual inspection coverages corresponding to the first training samples. The first training samples and the first labels may be obtained based on historical data.

The first training samples may be categorized into a first class of training sample, a second class of training sample, and a third class of training sample. The first class of training sample refers to a first training sample that contains only the inspection type parameter of the drone inspection. The second class of training sample refers to a first training sample that contains only the inspection type parameter of the robotic inspection. The third class of training sample refers to a first training sample that contains only the inspection type parameter of the manual inspection.

The first labels may be categorized into a first class label, a second class label, and a third class label, which are the labels corresponding to the first class of training sample, the second class of training sample, and the third class of training sample, respectively, i.e., the actual inspection accuracy and the actual inspection coverage of the drone inspection, the robotic inspection, the manual inspection, respectively.

In some embodiments, the government gas supervision management platform may perform joint training of the feature extraction layer and the drone output layer using the first class of training sample by inputting the sample pipeline distribution, the sample pipeline supervision information, and the sample facility supervision information of the sample inspection sub-routes into an initial feature extraction layer, and inputting a feature vector output from the initial feature extraction layer into an initial drone output layer, to construct a loss term (denoted as loss term 1) through the first class label and a result of the initial drone output layer to.

Similarly, the government gas supervision management platform may perform joint training of the feature extraction layer and the robotic output layer using the second class of training sample, and construct another loss term (denoted as loss term 2) through the second class label and a result of an initial robotic output layer. The government gas supervision management platform may perform joint training of the feature extraction layer and the manual output layer using the third class of training sample, and construct another loss term (denoted as loss term 3) through the third class label and a result of an initial manual output layer.

In some embodiments, the government gas supervision management platform may perform joint training of the feature extraction layer, the drone output layer, the robotic output layer, and the manual output layer. The government gas supervision management platform may construct a first loss function based on the loss term 1, the loss term 2, and the loss term 3 in various ways (e.g., weighted summation, etc.), and iteratively update parameters of the feature extraction layer, the drone output layer, the robotic output layer, and the manual output layer at the same time via gradient descent or other methods based on the first loss function. The training may be completed when a preset condition is met, and a trained feature extraction layer, a trained drone output layer, a trained robotic output layer, and a trained manual output layer may be obtained. The preset condition may be that the first loss function converges, a count of iterations reaches a threshold, or the like.

In some embodiments of the present disclosure, with different output layers of the inspection model, the predicted accuracy rates and the predicted coverages corresponding to different inspection type parameters can be accurately and efficiently predicted, which is conducive to reasonable selection of the inspection type parameters of the subsequent inspection sub-routes, ensuring the smooth operation of inspection to the fullest extent.

FIG. 4 is a flowchart illustrating an exemplary process of determining a new target sub-route and an inspection type parameter of the new target sub-route according to some embodiments of the present disclosure. As shown in FIG. 4, a process 400 may include operations 410-420. In some embodiments, the process 400 may be performed by the government gas supervision management platform 130.

In 410, in response to determining that a predicted inspection effect satisfying a second preset condition does not exist, at least one target sub-route and an adjustment type of the at least one target sub-route may be determined.

The target sub-route refers to an inspection sub-route that needs to be reclassified or adjusted for the inspection type parameter. In some embodiments, in response to determining that an inspection sub-route does not have the predicted inspection effect that satisfies the second preset condition (i.e., for one inspection sub-route, the predicted inspection effects of all the inspection type parameters do not satisfy the second preset condition), the government gas supervision management platform may determine the inspection sub-route as the target sub-route.

The adjustment type refers to a type of an adjustment mode made to the target sub-route. In some embodiments, the adjustment type may include a first type corresponding to a predicted coverage less than a first threshold, and a second type corresponding to a predicted accuracy rate less than a second threshold.

In some embodiments, for a target sub-route of which the predicted inspection effect does not satisfy the second preset condition (i.e., does not satisfy that the predicted accuracy rate is greater than the second threshold and the predicted coverage is greater than the first threshold), if the predicted coverage corresponding to the target sub-route is less than the first threshold, the government gas supervision management platform may determine that the corresponding adjustment type is the first type; and if the predicted coverage corresponding to the target sub-route is greater than the first threshold and the predicted accuracy rate is less than the second threshold, the government gas supervision management platform may determine that the corresponding adjustment type is the second type.

Since the predicted coverage corresponding to the inspection sub-route of the first type is less than the first threshold, the predicted coverage being less than the first threshold represents that some areas or positions of the inspection sub-route are not suitable for automatic inspection by the inspection equipment, and thus performing the manual inspection may be considered at this time. The first type therefore refers to directly performing the manual inspection of the target sub-route.

Since the predicted accuracy rate corresponding to the inspection sub-route of the second type is less than the second threshold, the predicted accuracy rate being less than the second threshold represents that a current inspection type parameter of the inspection sub-route is not quite suitable, but the current inspection type parameter is already the inspection type parameter with the highest inspection accuracy, thus performing the inspection using a plurality of inspection type parameters at the same time may be considered, thereby improving the inspection accuracy. Therefore, the second type refers to the simultaneous inspection of the target sub-route using the plurality of inspection type parameters (e.g., using the drone inspection and the robotic inspection simultaneously).

More descriptions regarding the related parameters such as the second preset condition, the first threshold, the second threshold, the predicted accuracy rate, the predicted coverage, the inspection type parameter, and the predicted inspection effect may be found elsewhere in the present disclosure (the related descriptions of FIG. 2).

In 420, in response to determining that the adjustment type is a first type, at least one new target sub-route may be obtained by adjusting the at least one target sub-route based on the predicted inspection effect corresponding to the at least one target sub-route.

The new target sub-route refers to an adjusted target sub-route.

In some embodiments, in response to determining that the adjustment type is the first type (i.e., the predicted coverage of the target sub-route is less than the first threshold), the government gas supervision management platform may separate gas pipelines from the at least one target sub-route that are inconveniently accessible by road or geographically remote based on a pipeline distribution and pipeline defective information to obtain the at least one new target sub-route. In the predicted inspection effect corresponding to the at least one target sub-route, the smaller the predicted coverage, the more detailed the re-division of the at least one target sub-route, i.e., the more the count of the new target sub-routes acquired by re-division. More details regarding the pipeline distribution and the pipeline defective information may be found elsewhere in the present disclosure (e.g., the related descriptions of FIG. 2).

For example, if a target sub-route $S_1$ "①-②-③-④-⑤-⑥" has a predicted coverage of 70%, which is less than the first threshold of 80%, the adjustment type may be the first type, wherein as a gas pipeline ① and a gas pipeline ③ are geographically remote, the gas pipeline ① and the gas pipeline ③ may be classified as a new target sub-route $S^{11}$ "①-③", the manual inspection may be directly adopted for the new target sub-route $S^{11}$ "①-③", and gas pipelines ②, ④, ⑤ and ⑥ may be classified into another new target sub-route $S^{12}$ "②-④-⑤-⑥", and may follow the previous inspection type parameter; or the at least one target sub-route may be adjusted by performing segmentation processing according to a main pipeline branch and a bypass pipeline branch to obtain the at least one new target sub-route. More descriptions regarding the segmentation processing according to the main pipeline branch and the bypass pipeline branch may be found elsewhere in the present disclosure (e.g., the related descriptions of FIG. 2).

In some embodiments of the present disclosure, in response to determining that the predicted inspection effects of all inspection type parameters do not satisfy the preset requirements, the inspection sub-route may be regarded as a target sub-route that needs to be reclassified. For the target sub-route of which the predicted coverage is less than the first threshold, re-adjustment may be made according to the predicted inspection effect, and the manual inspection may be directly adopted for the new target sub-route with inconvenient road or remote location, which is conducive to improving the final inspection coverage.

In some embodiments, as shown in FIG. 4, the process 400 may further include operation 430. The operation 430 may be performed by the government gas supervision management platform 130.

In 430, in response to determining that the adjustment type is a second type, an inspection type parameter of the at least one target sub-route may be updated based on the predicted inspection effect corresponding to the at least one target sub-route.

In some embodiments, in response to determining that the adjustment type is the second type (i.e., the predicted accuracy rate of the at least one target sub-route is less than the second threshold), the government gas supervision management platform may select, based on the predicted inspection effect corresponding to the at least one target sub-route, two inspection type parameters that have the highest predicted accuracy rate, and implement the two inspection type parameters for the at least one target sub-route simultaneously.

In some embodiments of the present disclosure, in response to determining that the predicted accuracy rate of the at least one target sub-route is less than the second threshold, the two inspection type parameters with the highest predicted accuracy rate may be implemented for the target sub-route at the same time, which is conducive to improving the final inspection accuracy rate.

In some embodiments, as shown in FIG. 4, the process 400 may further include operation 440. The operation 440 may be performed by the government gas supervision management platform 130.

In 440, in response to determining that a count of the at least one target sub-route of which the adjustment type is the second type exceeds a count threshold, the at least one new target sub-route and the predicted inspection effect of the at least one new target sub-route may be determined based on a pipeline distribution of the at least one target sub-route.

The count threshold refers to a maximum critical value for the at least one target sub-route that the adjustment type is the second type when the at least one target sub-route needs to be updated. The count threshold may be preset manually.

In some embodiments, when the count of the at least one target sub-route of which the adjustment type is the second type exceeds the count threshold, the government gas supervision management platform or a human being may perform, based on the pipeline distribution of the at least one target sub-route, segmentation processing on the at least one target sub-route of which the adjustment type is the second type to obtain a plurality of new target sub-routes through subdivision, and predict the predicted inspection effects of the corresponding inspection sub-routes. One type of segmentation processing may obtain one set of new target sub-routes, and different segmentation processing may obtain a plurality of sets of new target sub-routes. More descriptions regarding determining the predicted inspection effect may be found elsewhere in the present disclosure (e.g., the related descriptions of with FIG. 2).

In some embodiments, if the plurality of sets of new target sub-routes corresponding to all the segmentation processing do not guarantee that the predicted inspection effects of all the inspection sub-routes satisfy the second preset condition, the at least one target sub-route may be subdivided by selecting a mode obtaining the smallest count of inspection sub-routes of which the predicted inspection effects do not satisfy the second preset condition.

In some embodiments, the government gas supervision management platform may determine the predicted inspection effects of the at least one new target sub-route through an inspection model. More descriptions may be found elsewhere in the present disclosure (e.g., the related descriptions of with FIG. 4).

In some embodiments of the present disclosure, in response to determining that the count of the at least one target sub-route of which the predicted accuracy rate is less than the second threshold is large, the at least one target sub-route may be subdivided according to the pipeline distribution to obtain the at least one new target sub-route and corresponding predicted inspection effect, thereby ensuring that the inspection accuracy of the final inspection sub-routes is high.

Figure 5:
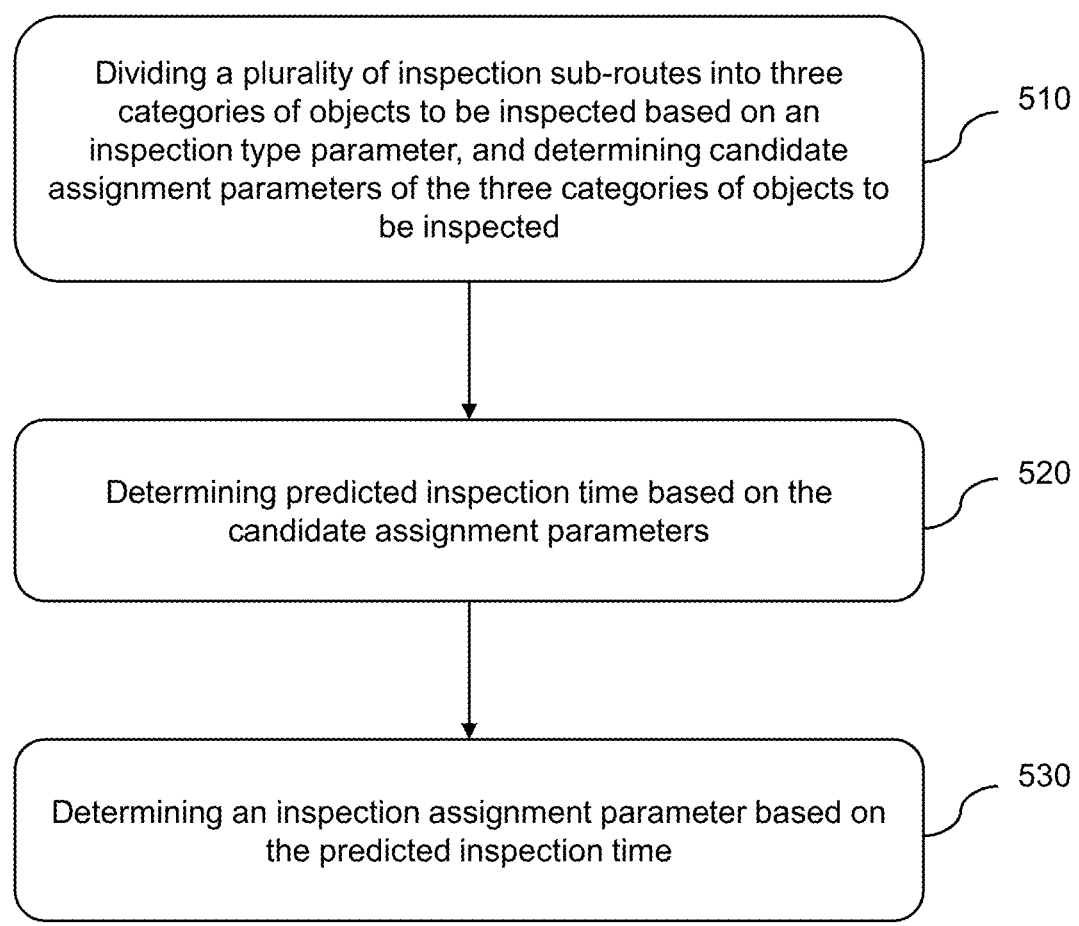
FIG. 5 is a flowchart illustrating an exemplary process of determining an inspection assignment parameter according to some embodiments of the present disclosure.

FIG. 5 is a flowchart illustrating an exemplary process of determining an inspection assignment parameter according to some embodiments of the present disclosure. As shown in FIG. 5, a process 500 may include operations 510-530. In some embodiments, the process 500 may be performed by the government gas supervision management platform 130.

In 510, a plurality of inspection sub-routes may be divided into three categories of objects to be inspected based on an inspection type parameter, and candidate assignment parameters of the three categories of objects to be inspected may be determined.

The objects to be inspected refer to categories of the plurality of inspection sub-routes categorized according to the inspection type parameter. In some embodiments, the three categories of objects to be inspected may be a drone inspection sub-route, a robotic inspection sub-route, and a manual inspection sub-route.

In some embodiments, the government gas supervision management platform may traverse all inspection sub-routes to categorize inspection sub-routes of a drone inspection into the drone inspection sub-routes, categorize inspection sub-routes of a robotic inspection into the robotic inspection sub-routes, and categorize inspection sub-routes of a manual inspection into the manual inspection sub-routes, thereby completing the division of the plurality of inspection sub-routes into the three categories of objects to be inspected.

The candidate assignment parameters refer to parameters used as candidate inspection assignment parameters. Each category of objects to be inspected may have a plurality of corresponding candidate assignment parameters.

In some embodiments, the candidate assignment parameters may be represented by a sequence consisting of matching pairs of inspection equipment, or an inspector, with a corresponding initial inspection sub-route. For example, taking the objects to be inspected are the drone inspection sub-routes as an example, the drone inspection sub-routes may include inspection sub-route $S_1$-inspection sub-route $S_{10}$, and drones may include drone 1-drone 4, then the candidate assignment parameters may be {(drone 1, initial inspection sub-route $S_1$), (drone 2, initial inspection sub-route $S_3$), (drone 3, initial inspection sub-route $S_6$), (drone 4, initial inspection sub-route $S_{10}$)}, representing that the drone 1, the drone 2, the drone 3, and the drone 4 start the inspection operation from the initial inspection sub-route $S_1$, the initial inspection sub-route $S_3$, the initial inspection sub-route $S_6$, and the initial inspection sub-route $S_{10}$, respectively.

The initial inspection sub-route refers to a first inspection sub-route that the inspection equipment or the inspector starts the current inspection.

In some embodiments, if a count of the inspection equipments (or the inspectors) is less than a count of the inspection sub-routes, after the inspection equipment (or the inspectors) complete the inspection of the initial inspection sub-route, the inspection equipment (or the inspectors) may continue to be assigned to the closest inspection sub-route that is not inspected to the inspection equipment (or the inspector). Further, if only one inspection sub-route is inspected and other inspection sub-routes complete the inspection, then the inspection equipment (or the inspectors) which are idle may be assigned to the inspection sub-route as well.

Continuing with the example, if the drone 1 completes the inspection of the initial inspection sub-route $S_1$, the drone 1 is closest to the inspection sub-route $S_2$ which is not inspected, then the drone 1 may be continued to be assigned to the inspection sub-route $S_2$, and the same for the remaining drones. Furthermore, if the drone 3 completes the inspection of the inspection sub-route $S_7$, and finds that only the inspection sub-route $S_8$ is left to be inspected by the drone 4, then the drone 3 may be also assigned to the inspection sub-route $S_8$ until all the inspection sub-routes are inspected, then the candidate assignment parameters may be {(drone 1, inspection sub-route $S_1$-inspection sub-route $S_2$), (drone 2, inspection sub-route $S_3$-inspection sub-route $S_4$-inspection sub-route $S_5$), (drone 3, inspection sub-route $S_6$-inspection sub-route $S_7$-inspection sub-route $S_8$), (drone 4, inspection sub-route $S_{10}$-inspection sub-route $S_9$-inspection sub-route $S_8$)}.

In some embodiments, the government gas supervision management platform may calculate, based on the position of the inspection equipment or the inspector, a start position and an end position of the inspection sub-route, a position distance between the inspection equipment or the inspector and the start position and the end position of each uninspected inspection sub-route, and select an inspection sub-route with the smallest position distance as the next inspection sub-route of the inspection equipment or the inspector. The position of the inspection equipment or the inspector may be spontaneously acquired and uploaded to the government gas supervision management platform by a positioning device (e.g., a GPS locator, etc.) carried by the inspection equipment or the inspector. The start position and the end location of the inspection sub-route may be obtained based on the pipeline distribution.

In some embodiments, the government gas supervision management platform may randomly select an inspection sub-route as the initial inspection sub-route and randomly assign the initial inspection sub-route to the inspection equipment (or the inspector), so as to randomly generate the plurality of candidate assignment parameters.

More descriptions regarding the related parameters such as the inspection type parameter, the inspection equipment, the inspector, the pipeline distribution, or the like may be found elsewhere in the present disclosure (e.g., the related descriptions of FIG. 2).

In 520, predicted inspection time may be determined based on the candidate assignment parameters.

The predicted inspection time refers to inspection time which is predicted. The inspection time refers to the time required to inspect all the objects of a category of objects to be inspected, such as 6 h, 10 h, etc. Each category of objects to be inspected may a plurality of corresponding candidate assignment parameters. Each of the corresponding candidate assignment parameters may correspond to one predicted inspection time.

In some embodiments, the government gas supervision management platform may determine the predicted inspection time in various ways based on the candidate assignment parameters. For example, the government gas supervision management platform may determine the predicted inspection time by vector matching.

In some embodiments, for a category of objects to be inspected, the government gas supervision management platform may construct a second vector database based on historical data, the second vector database including a plurality of second reference vectors and corresponding reference inspection time. One second reference vector may be obtained based on the historical data of the category of objects to be inspected. One second reference vector may be constructed based on a count of historical inspection sub-routes, a historical pipeline distribution, historical pipeline supervision information, and historical facility supervision information in the category of objects to be inspected, and a historical inspection assignment parameter of the category of objects to be inspected. The reference inspection time may be corresponding historical actual inspection time.

For the category of objects to be inspected, the government gas supervision management platform may construct a second object vector based on a count of current inspection sub-routes, a pipeline distribution, pipeline supervision information, and facility supervision information in the category of objects to be inspected, and the candidate assignment parameters of the category of objects to be inspected.

In some embodiments, the government gas supervision management platform may retrieve, in the second vector database, one or more second reference vectors of which vector distances from the second target vector are less than a second distance threshold. For the one or more second reference vectors, the corresponding one or more reference inspection time may be averaged, and an average value of the one or more reference inspection time may be determined as the predicted inspection time.

The vector distance may be any one of a Euclidean distance, a cosine distance, a Mahalanobis distance, or the like. The second distance threshold may be determined manually based on priori experience or historical data.

In some embodiments, for the category of objects to be inspected, the government gas supervision management platform may determine the predicted inspection time based on the candidate assignment parameters, object types, and the pipeline distribution of the inspection sub-routes, the pipeline supervision information, and the facility supervision information through a temporal model.

The object type refers to a type of the objects to be inspected. In some embodiments, the object type may include a drone, a robot, and a manual corresponding to the drone inspection sub-route, the robotic inspection sub-route, and the manual inspection sub-route, respectively.

The temporal model refers to a model that is used to determine the predicted inspection time. In some embodiments, the temporal model may be a machine learning model, e.g., neural networks (NN).

One category of objects to be inspected may have a corresponding temporal model. The three categories of objects to be inspected may correspond to three temporal models.

Figure 6:
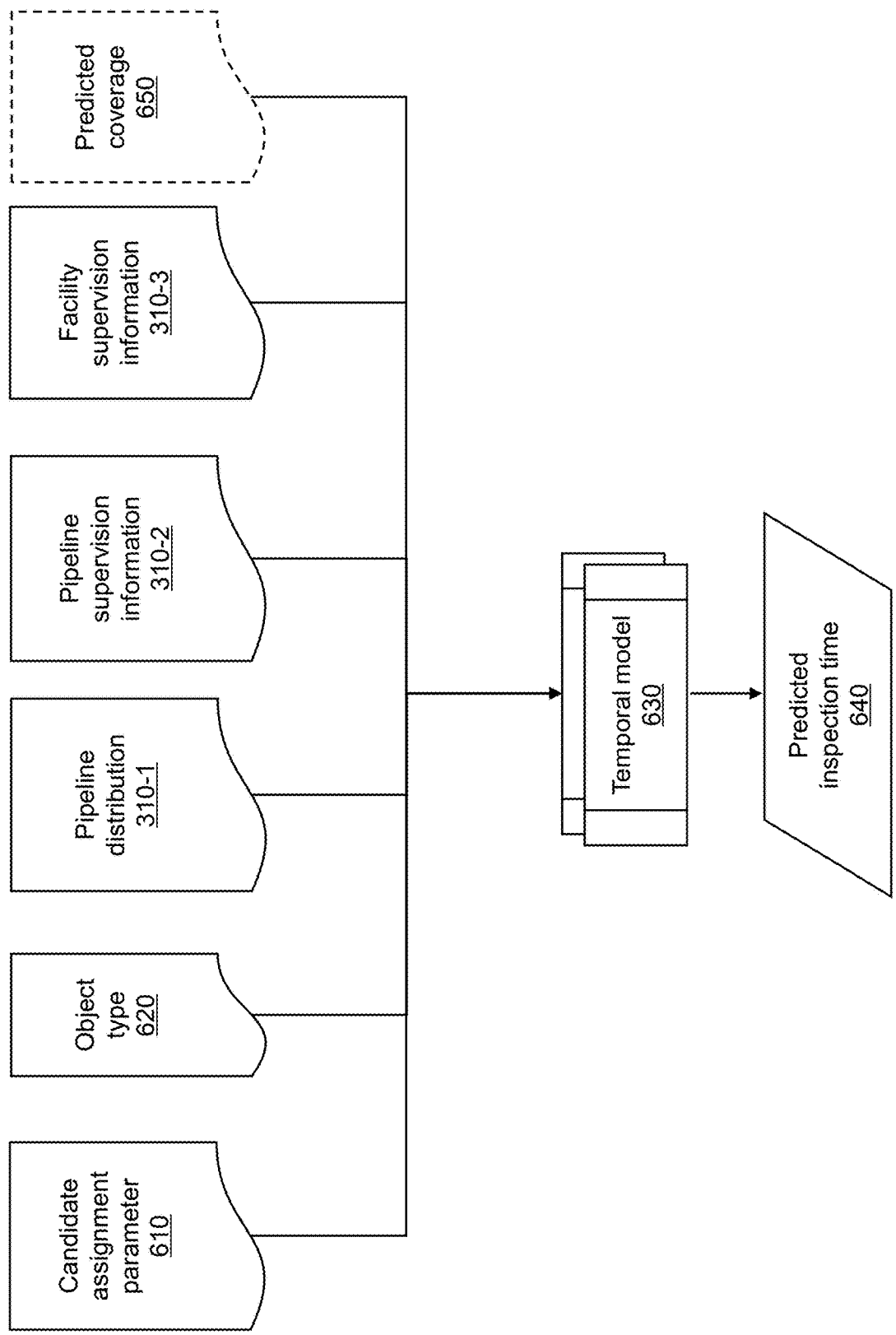
FIG. 6 is a schematic diagram illustrating an exemplary temporal model according to some embodiments of the present disclosure.

In some embodiments, as shown in FIG. 6, an input of the temporal model 630 may include a candidate assignment parameter 610, an object type 620, and the pipeline distribution 310-1, the pipeline supervision information 310-2, and the facility supervision information 310-3 of the inspection sub-route, and an output of the temporal model 630 may include an predicted inspection time 640.

In some embodiments, as shown in FIG. 6, the input of the temporal model 630 may further include a predicted coverage 650 corresponding to the inspection sub-route.

More descriptions regarding the pipeline distribution, the pipeline supervision information, the facility supervision information, and the predicted coverage may be found elsewhere in the present disclosure (e.g., the related descriptions of FIG. 2).

In some embodiments of the present disclosure, the predicted coverage corresponding to the inspection sub-route may be added as the input of the temporal model, such that the more accurate prediction of the predicted inspection time can be realized.

In some embodiments, for the category of objects to be inspected, the government gas supervision management platform may train the temporal model corresponding to the category of objects to be inspected based on a plurality of second training samples with second labels. The second training samples may include sample inspection assignment parameters, sample object types, and a sample pipeline distribution, sample pipeline supervision information, sample facility supervision information, and a sample inspection coverage of sample inspection sub-routes. The second labels may include actual inspection time corresponding to the second training samples. The second training samples and the second labels may be obtained from historical data.

In some embodiments, the government gas supervision management platform may train the temporal model using the second training samples by inputting the sample inspection assignment parameters, the sample object types, and the sample pipeline distribution, the sample pipeline supervision information, sample facility supervision information, and sample inspection coverage of the sample inspection sub-routes into an initial temporal model, constructing a second loss function through the second labels and results of the initial temporal model, and iteratively update parameters of the temporal model through gradient descent or other methods based on the second loss function. In response to determining that a preset condition is satisfied, the training of the temporal model may be completed. The preset condition may be that the second loss function converges, a count of iterations reaches a threshold, etc.

In some embodiments, the inspection model and the temporal model may be jointly trained.

In some embodiments, the government gas supervision management platform may perform joint training of the inspection model and the temporal model based on a plurality of third training samples with third labels. The third training samples may include sample inspection assignment parameters, sample object types, and a sample pipeline distribution, sample pipeline supervision information, and sample facility supervision information of sample inspection sub-routes. The third labels may include actual inspection time, actual inspection accuracy rates, and actual inspection success rates corresponding to the third training samples. The third training samples and the third labels may be obtained from historical data.

For the drone inspection sub-route, the third training samples may be the sample inspection assignment parameters, the sample object types, and the first category of training samples; for the robotic inspection sub-route, the third training samples may be the sample inspection assignment parameters, the sample object types, and the second category of training samples; for the manual inspection sub-route, the third training samples may be the sample inspection assignment parameters, the sample object types, and the third category of training samples, for the joint training of the three temporal models and inspection models applicable to the three categories of objects to be inspected, respectively.

In some embodiments, for the category of objects to be inspected (e.g., the drone inspection sub-route), the government gas supervision management platform may perform joint training of the inspection model and the temporal model using the corresponding third training samples by inputting the sample pipeline distribution, the sample pipeline supervision information, and the sample facility supervision information of the sample inspection sub-routes into the inspection model, outputting the corresponding predicted coverage, predicted accuracy rate, and predicted success rate by a corresponding output layer (e.g., a drone output layer) of the inspection model, and inputting the predicted coverage output from the inspection model and the third training samples into the temporal model to output the predicted inspection time.

A first loss term may be constructed by the actual inspection accuracy and the actual inspection success rate (the third labels), and the predicted accuracy rate and the predicted success rate (the output result) output by the inspection model; a second loss term may be constructed by the actual inspection time (the third labels) and the predicted inspection time (the output result) output by the inspection model.

In some embodiments, the loss function for joint training may be determined based on a weighted summation of the first loss term and the second loss term. A sum of a weight of the first loss term and a weight of the second loss term may be 1.

In some embodiments, the weight of the first loss term may be determined based on at least one of an inspection scale and a volume of user negative feedback. For example, the government gas supervision management platform may determine the weight of the first loss term based on a preset correspondence. The preset correspondence may be manually preset. For example, the inspection scale may be negatively correlated with the weight of the first loss term, and the volume of user negative feedback may be positively correlated with the weight of the first loss term.

The inspection scale refers to a scale of the inspection operation. For example, the inspection scale may be represented by the size of an area of the inspection range, a size of the total length of the inspection route, etc.

The volume of user negative feedback refers to an amount of user negative feedback. For example, the volume of user negative feedback may be represented by a count of bad reviews from users, etc.

In some embodiments of the present disclosure, the loss function for joint training may be determined based on the weighted summation of the first loss term and the second loss term, and the weight may be determined based on the inspection scale or the volume of user negative feedback, such that the loss function for joint training can be more accurate, thereby dynamically determining the loss function according to the actual situation.

In some embodiments, the government gas supervision management platform may iteratively update the parameters of the inspection model and the temporal model based on the loss function for the joint training through gradient descent or other methods. The training may be completed when a preset condition is satisfied, and a trained inspection model and a trained temporal model may be obtained. The preset condition may be that the loss function of the joint training converges, a count of iterations reaches a threshold, etc.

In some embodiments of the present disclosure, the accuracy of the inspection model and the temporal model can be further improved by jointly training of the inspection model and the temporal model, which makes the prediction of the inspection time more accurate.

In some embodiments of the present disclosure, the predicted inspection time of the objects to be inspected can be quickly and accurately determined by the machine learning model, which is conducive to the subsequent reasonable selection of the inspection type parameter of the inspection sub-routes.

In 530, an inspection assignment parameter may be determined based on the predicted inspection time.

In some embodiments, the government gas supervision management platform may determine a candidate assignment parameter that has the shortest predicted inspection time as the inspection assignment parameter.

In some embodiments of the present disclosure, the candidate assignment parameters for various types of objects to be inspected may be determined based on the inspection type parameter, then the predicted inspection time for each of the candidate assignment parameters may be determined, and the inspection assignment parameter having the shortest inspection time may be further selected, thereby reducing the time consumption in the inspection process, and improving the inspection efficiency.

One or more embodiments of the present disclosure provide an inspection device for smart gas supervision information. The inspection device may include at least one storage device and at least one processor. The at least one memory may be configured to store computer instructions. The at least one processor may be configured to execute the computer instructions or part of the computer instructions to implement the inspection method for the smart gas supervision information.

One or more embodiments of the present disclosure provide a non-transitory computer-readable storage medium, comprising computer instructions that, and when read by a computer, may direct the computer to implement the inspection method for the smart gas supervision information.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An inspection method for smart gas supervision information, implemented based on an Internet of Things (IoT) system for smart gas supervision information, wherein the IoT system for smart gas supervision information includes a public user platform, a citizen cloud service platform, a government gas supervision management platform, a government gas supervision sensor network platform, a government gas supervision object platform, a gas company sensor network platform, and a gas equipment object platform, the public user platform is configured as a terminal device, the citizen cloud service platform is configured as a computer cloud platform, the government gas supervision management platform includes at least one central processing unit, the government gas supervision sensor network platform is configured as a communication network or a gateway, the government gas supervision object platform includes at least one storage device, the gas company sensor network platform is configured as the communication network or the gateway, the gas equipment object platform is configured as an inspection equipment, the inspection equipment includes a drone and a robot, the public user platform and the citizen cloud service platform perform bidirectional interaction, the government gas supervision management platform performs upward bidirectional interaction with the citizen cloud service platform and performs downward bidirectional interaction with the government gas supervision sensor network platform, the government gas supervision sensor network platform performs downward bidirectional interaction with the government gas supervision object platform, the government gas supervision object platform performs downward bidirectional interaction with the gas company sensor network platform, wherein the government gas supervision object platform includes a gas company management platform, the government gas supervision object platform is configured to store a plurality of inspection sub-routes and pipeline supervision information, and execute calling instruction issued by the government gas supervision management platform, and the gas company management platform is configured to obtain an inspection route; and the gas company sensor network platform performs downward bidirectional interaction with the gas equipment object platform, and the gas equipment object platform is configured to execute an acquisition instruction and an inspection instruction issued by the government gas supervision management platform;

the method is implemented by the government gas supervision management platform, and the method comprises:

obtaining the inspection route based on the gas company management platform;

determining the plurality of inspection sub-routes by performing segmentation processing on the inspection route, and storing the plurality of inspection sub-routes to the government gas supervision object platform;

generating the calling instruction and sending the calling instruction to the gas company management platform of the government gas supervision object platform for implementation, wherein the calling instruction is configured to obtain the pipeline supervision information corresponding to the plurality of inspection sub-routes, the pipeline supervision information including at least one of pipeline defective information and a pipeline inspection result of a first historical time period, wherein a duration of the first historical time period is positively correlated with remaining computing resources of the government gas supervision management platform, and the remaining computing resources are determined based on an average occupancy of all central processing units within the government gas supervision management platform, and the generating the calling instruction and sending the calling instruction to the gas company management platform of the government gas supervision object platform for implementation includes:

automatically generating the calling instruction based on a manually preset instruction template and sending the calling instruction to the government gas supervision object platform for implementation through the government gas supervision sensor network platform; and calling, by the the government gas supervision object platform, based on the calling instruction, the pipeline supervision information corresponding to the plurality of inspection sub-routes stored in the government gas supervision object platform;

generating the acquisition instruction based on the gas company management platform and sending the acquisition instruction to the gas equipment object platform for implementation, wherein the acquisition instruction is configured to control gas appurtenant facilities deployed on the plurality of inspection sub-routes to acquire and upload facility supervision information, wherein the generating the acquisition instruction based on the gas company management platform and sending the acquisition instruction to the gas equipment object platform for implementation includes:

automatically generating the acquisition instruction based on the manually preset instruction template and sending the acquisition instruction to the gas equipment object platform for implementation through the government gas supervision sensor network platform via the government gas supervision object platform and the gas company sensor network platform;

determining an inspection type parameter of the plurality of inspection sub-routes based on the pipeline supervision information and the facility supervision information, wherein the inspection type parameter includes at least one of drone inspection, robotic inspection, and manual inspection, wherein the determining the inspection type parameter of each of the plurality of inspection sub-routes based on the pipeline supervision information and the facility supervision information includes:

through the government gas supervision management platform:

predicting a predicted inspection effect of the inspection type parameter based on the pipeline supervision information and the facility supervision information, the predicted inspection effect including a predicted accuracy rate and a predicted coverage; and determining the inspection type parameter of each of the plurality of inspection sub-routes based on the predicted inspection effect that satisfies a second preset condition, wherein the predicting the predicted inspection effect of the inspection type parameter based on the pipeline supervision information and the facility supervision information includes:
  determining the predicted inspection effect through an inspection model based on the pipeline supervision information, the facility supervision information, and a pipeline distribution, wherein the inspection model is a Neural Networks model; and
  training the inspection model via a gradient descent based on first training samples with first labels, the first training samples including sample pipeline distributions, sample pipeline supervision information, and sample facility supervision information of sample inspection sub-routes, and the first labels including actual inspection accuracies and actual inspection coverages corresponding to the first training samples;
determining an inspection assignment parameter based on the inspection type parameter;
generating the inspection instruction and sending the inspection instruction to the gas equipment object platform for implementation, wherein the inspection instruction is configured to control the inspection equipment to perform the inspection assignment parameter, wherein the generating the inspection instruction and sending the inspection instruction to the gas equipment object platform for implementation includes:
automatically generating the inspection instruction based on the manually preset instruction template and sending the inspection instruction to the gas equipment object platform for implementation through the government gas supervision sensor network platform and the gas company sensor network platform;
during the inspection,
in response to determining that an actual coverage of one or more inspection sub-routes satisfies a first preset condition, updating the plurality of inspection sub-routes to obtain new inspection sub-routes, the new inspection sub-routes including uncovered sub-routes;
adjusting the inspection assignment parameter based on the uncovered sub-routes;
sending an updated inspection assignment parameter to the gas equipment object platform for implementation;
controlling, via the gas equipment object platform by the gas equipment object platform, the inspection equipment to perform an inspection operation based on the updated inspection assignment parameter; and
after the inspection is completed, sending a current pipeline inspection result and the pipeline defective information corresponding to the new inspection sub-routes to the gas company management platform of the government gas supervision object platform for storage.

2. The inspection method of claim 1, further comprising:
through the government gas supervision management platform:
in response to determining that the predicted inspection effect satisfying the second preset condition does not exist, determining at least one target sub-route and an adjustment type of the at least one target sub-route, wherein the adjustment type includes a first type corresponding to the predicted coverage less than a first threshold, and a second type corresponding to the predicted accuracy rate less than a second threshold;
wherein the first threshold is determined based on at least one of a density, a data redundancy, or a fault correlation of the gas appurtenant facilities of the plurality of inspection sub-routes, and the second threshold is positively correlated with a gas risk value corresponding to the plurality of inspection sub-routes; and
in response to determining that the adjustment type is the first type, obtaining at least one new target sub-route by adjusting the at least one target sub-route based on the predicted inspection effect corresponding to the at least one target sub-route.

3. The inspection method of claim 2, further comprising:
through the government gas supervision management platform:
in response to determining that the adjustment type is the second type, updating the inspection type parameter of the at least one target sub-route based on the predicted inspection effect corresponding to the at least one target sub-route.

4. The inspection method of claim 1, wherein the determining an inspection assignment parameter based on the inspection type parameter includes:
through the government gas supervision management platform:
dividing the plurality of inspection sub-routes into three categories of objects to be inspected based on the inspection type parameter, and determining candidate assignment parameters of the three categories of objects to be inspected;
determining predicted inspection time based on the candidate assignment parameters; and
determining the inspection assignment parameter based on the predicted inspection time, including:
  for one category of objects to be inspected, determining the predicted inspection time based on the candidate assignment parameters, an object type, and the pipeline distribution, the pipeline supervision information, and the facility supervision information of the plurality of inspection sub-routes through a temporal model, wherein the temporal model is a Neural Networks model, and the inspection model and the temporal model are jointly trained.

5. The inspection method of claim 1, wherein the inspection model includes a feature extraction layer, a drone output layer, a robotic output layer, and a manual output layer;
the feature extraction layer is a Deep Neural Networks model, an input of the feature extraction layer includes the pipeline distribution, the pipeline supervision information, and the facility supervision information of the plurality of inspection sub-routes, and an output of the feature extraction layer includes a feature vector;
the drone output layer is a Convolutional Neural Networks model, an input of the drone output layer includes the feature vector, and an output of the drone output layer includes a predicted accuracy rate of a drone inspection and a predicted coverage of the drone inspection;
the robotic output layer is a Convolutional Neural Networks model, an input of the robotic output layer includes the feature vector, and an output of the robotic output layer includes a predicted accuracy rate of the robotic inspection and a predicted coverage of the robotic inspection; and
the manual output layer is a Convolutional Neural Networks model, an input of the manual output layer includes the feature vector, and an output of the manual output layer includes a predicted accuracy rate of the manual inspection and a predicted coverage of the manual inspection.

6. The inspection method of claim 5, wherein
the first training samples is categorized into a first class of training sample, a second class of training sample, and a third class of training sample; the first labels is categorized into a first class label, a second class label, and a third class label, the first class label corresponds to the first class of training sample, the second class label corresponds to the second class of training sample, and the third class label corresponds to the third class of training sample, and the training the inspection model via the gradient descent based on the first training samples with the first labels includes:
  jointly training the feature extraction layer and the drone output layer by using the first class of training sample, and constructing a first loss term through the first class label and a result of an initial drone output layer;
  jointly training the feature extraction layer and the robotic output layer by using the second class of training sample, and constructing a second loss term through the second class label and a result of an initial robotic output layer;
  jointly training the feature extraction layer and the manual output layer by using the second class of training sample, and constructing a third loss term through the third class label and a result of an initial manual output layer; and
  jointly training the feature extraction layer, the drone output layer, the robotic output layer, and the manual output layer via the gradient descent based on a first loss function, wherein the first loss term constructs the first loss function, the second loss term, and the third loss term.

7. An Internet of Things (IoT) system for smart gas supervision information, comprising a public user platform, a citizen cloud service platform, a government gas supervision management platform, a government gas supervision sensor network platform, a government gas supervision object platform, a gas company sensor network platform, and a gas equipment object platform; wherein
  the public user platform is configured as a terminal device; the citizen cloud service platform is configured as a computer cloud platform; the government gas supervision management platform includes at least one central processing unit; the government gas supervision sensor network platform is configured as a communication network or a gateway, the government gas supervision object platform includes at least one storage device, the gas company sensor network platform is configured as the communication network or the gateway, the gas equipment object platform is configured as an inspection equipment, the inspection equipment includes a drone and a robot;
  the public user platform and the citizen cloud service platform perform bidirectional interaction;
  the government gas supervision management platform performs upward bidirectional interaction with the citizen cloud service platform and performs downward bidirectional interaction with the government gas supervision sensor network platform, wherein the government gas supervision management platform is configured to:
  obtain an inspection route based on the gas company management platform;
  determine a plurality of inspection sub-routes by performing segmentation processing on the inspection route, and store the plurality of inspection sub-routes to the government gas supervision object platform;
  generate a calling instruction and send the calling instruction to the gas company management platform of the government gas supervision object platform for implementation, wherein the calling instruction is configured to obtain pipeline supervision information corresponding to the plurality of inspection sub-routes, the pipeline supervision information including at least one of pipeline defective information and a pipeline inspection result of a first historical time period, wherein a duration of the first historical time period is positively correlated with remaining computing resources of the government gas supervision management platform, and the remaining computing resources are determined based on an average occupancy of all central processing units within the government gas supervision management platform, and; to generate the calling instruction and send the calling instruction to the gas company management platform of the government gas supervision object platform for implementation, the government gas supervision management platform is further configured to: automatically generate the calling instruction based on a manually preset instruction template and send the calling instruction to the government gas supervision object platform for implementation through the government gas supervision sensor network platform;
  the government gas supervision object platform is configured to:
    call, based on the calling instruction, the pipeline supervision information corresponding to the plurality of inspection sub-routes stored in the government gas supervision object platform;
  generate an acquisition instruction based on the gas company management platform and send the acquisition instruction to the gas equipment object platform for implementation, wherein the acquisition instruction is configured to control gas appurtenant facilities deployed on the plurality of inspection sub-routes to acquire and upload facility supervision information,
  wherein to generate the acquisition instruction based on the gas company management platform and send the acquisition instruction to the gas equipment object platform for implementation, the government gas supervision management platform is further configured to:
  automatically generate the acquisition instruction based on the manually preset instruction template and send the acquisition instruction to the gas equipment object platform for implementation through the government gas supervision sensor network platform via the government gas supervision object platform and the gas company sensor network platform;
  determine an inspection type parameter of each of the plurality of inspection sub-routes based on the pipeline supervision information and the facility supervision information, wherein the inspection type parameter includes at least one of drone inspection, robotic inspection, and manual inspection, wherein to determine the inspection type parameter of each of the plurality of inspection sub-routes based on the pipeline supervision information and the facility supervision information, the government gas supervision management platform is further configured to:
  predict a predicted inspection effect of the inspection type parameter based on the pipeline supervision information and the facility supervision information, the predicted inspection effect including a predicted accuracy rate and a predicted coverage; and determine the inspection type parameter of each of the plurality of inspection sub-routes based on the predicted inspection effect that satisfies a second preset condition;

wherein to predict the predicted inspection effect of the inspection type parameter based on the pipeline supervision information and the facility supervision information the government gas supervision management platform is further configured to:

determine the predicted inspection effect through an inspection model based on the pipeline supervision information, the facility supervision information, and a pipeline distribution, wherein the inspection model is a Neural Networks model; and train the inspection model via a gradient descent based on first training samples with first labels, the first training samples include sample pipeline distributions, sample pipeline supervision information, and sample facility supervision information of sample inspection sub-routes, and the first labels include actual inspection accuracies and actual inspection coverages corresponding to the first training samples;

determine an inspection assignment parameter based on the inspection type parameter;

generate an inspection instruction and send the inspection instruction to the gas equipment object platform for implementation, wherein the inspection instruction is configured to control the inspection equipment to perform the inspection assignment parameter, wherein to generate an inspection instruction and send the inspection instruction to the gas equipment object platform for implementation, the government gas supervision management platform is further configured to:

automatically generate the inspection instruction based on the manually preset instruction template and send the inspection instruction to the gas equipment object platform for implementation through the government gas supervision sensor network platform and the gas company sensor network platform;

during the inspection, in response to determining that an actual coverage of one or more inspection sub-routes satisfies a first preset condition, update the plurality of inspection sub-routes to obtain new inspection sub-routes, the new inspection sub-routes including uncovered sub-routes;

adjust the inspection assignment parameter based on the uncovered sub-routes;

send an updated inspection assignment parameter to the gas equipment object platform for implementation; and the gas equipment object platform is further configured to control the inspection equipment to perform an inspection operation based on the updated inspection assignment parameter;

after the inspection is completed, send a current pipeline inspection result and the pipeline defective information corresponding to the new inspection sub-routes to the gas company management platform of the government gas supervision object platform for storage;

the government gas supervision sensor network platform performs downward bidirectional interaction with the government gas supervision object platform;

the government gas supervision object platform performs downward bidirectional interaction with the gas company sensor network platform, wherein the government gas supervision object platform includes a gas company management platform, the government gas supervision object platform is configured to store the plurality of inspection sub-routes and the pipeline supervision information, and execute the calling instruction issued by the government gas supervision management platform, and the gas company management platform is configured to obtain the inspection route; and the gas company sensor network platform performs downward bidirectional interaction with the gas equipment object platform, and the gas equipment object platform is configured to execute the acquisition instruction and the inspection instruction issued by the government gas supervision management platform.

8. The IoT system of claim 7, wherein the government gas supervision management platform is further configured to:

in response to determining that the predicted inspection effect satisfying the second preset condition does not exist, determine at least one target sub-route and an adjustment type of the at least one target sub-route, wherein the adjustment type includes a first type corresponding to the predicted coverage and less than a first threshold, and a second type corresponding to the predicted accuracy rate and less than a second threshold; wherein the first threshold is determined based on at least one of a density, a data redundancy, or a fault correlation of the gas appurtenant facilities of the plurality of inspection sub-routes, and the second threshold is positively correlated with a gas risk value corresponding to the plurality of inspection sub-routes; and in response to determining that the adjustment type is the first type, obtain at least one new target sub-route by adjusting the at least one target sub-route based on the predicted inspection effect corresponding to the at least one target sub-route.

* * * * *